United States Patent
Devore et al.

(10) Patent No.: US 6,255,246 B1
(45) Date of Patent: Jul. 3, 2001

(54) BORATABENZENE COCATALYST WITH METALLOCENE CATALYST

(75) Inventors: David D. Devore; Francis J. Timmers; David R. Neithamer, all of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/487,399

(22) Filed: Jan. 18, 2000

Related U.S. Application Data

(63) Continuation of application No. 09/206,331, filed on Dec. 8, 1998, now abandoned, which is a continuation of application No. 08/821,506, filed on Mar. 21, 1997, now abandoned
(60) Provisional application No. 60/014,745, filed on Mar. 29, 1996.

(51) Int. Cl.[7] ............... B01J 31/00; B01J 37/00; B01J 21/02; C08F 4/02; C08F 4/60
(52) U.S. Cl. ............... 502/152; 502/155; 502/118; 502/128; 502/202; 526/132; 526/133; 526/134
(58) Field of Search ............... 502/103, 117, 502/128, 118, 152, 155, 702; 526/134

(56) References Cited

U.S. PATENT DOCUMENTS

| | | | |
|---|---|---|---|
| 4,381,386 | 4/1983 | Ritter et al. | 526/239 |
| 5,089,536 | 2/1992 | Palazzotto | 522/16 |
| 5,198,401 | 3/1993 | Turner et al. | 502/155 |
| 5,278,119 | 1/1994 | Turner et al. | 502/155 |
| 5,372,682 | 12/1994 | Devore et al. | 204/72 |
| 5,374,696 | 12/1994 | Rosen et al. | 526/126 |
| 5,425,872 | 6/1995 | Devore et al. | 204/59 |
| 5,457,171 | 10/1995 | Langhauser et al. | 526/132 |
| 5,470,993 | 11/1995 | Devore et al. | 556/11 |
| 5,486,632 | 1/1996 | Devore et al. | 556/11 |
| 5,494,874 | 2/1996 | Rosen et al. | 502/155 |
| 5,554,775 | 9/1996 | Krishnamurti et al. | 556/7 |
| 5,565,534 | 10/1996 | Aulbach et al. | 526/160 |
| 5,756,611 | * 5/1998 | Etherton et al. | 502/127 |
| 5,902,866 | * 5/1999 | Nagy et al. | 502/103 |
| 6,034,027 | * 3/2000 | Krishnamurti et al. | 502/117 |
| 6,107,421 | * 8/2000 | Timmers et al. | 502/152 |
| 6,114,270 | * 9/2000 | Krishnamurti et al. | 502/155 |

FOREIGN PATENT DOCUMENTS

| | | |
|---|---|---|
| 478913 B1 | 1/1988 | (EP) . |
| WO 97/01566 | * 1/1997 | (WO) . |

OTHER PUBLICATIONS

G. Bazan et al., J. Am. Chem. Soc., vol. 118, No. 9, pp. 2291–2292 Mar. 1996.*

(List continued on next page.)

Primary Examiner—Mark L. Bell
Assistant Examiner—J. Pasterczyk

(57) ABSTRACT

Boratabenzene cocatalysts, especially novel pentafluorophenyl boratabenzenes, are useful cocatalysts or activators with metallocenes. They are less expensive than prior art activators, are soluble and offer more irreversible reactions. Compositions comprise at least one metallocene catalyst and at least one dihydroboratabenzene or anion thereof. Processes include polymerizations with metallocenes in the presence of a boratabenzene cocatalyst.

18 Claims, 1 Drawing Sheet

OTHER PUBLICATIONS

G. Herberich et al., Chem. Ber., vol. 115, pp. 3315–3127 1982.*

K. Gustafsson, Acta Chem. Scandinavia B, vol. 32, No. 10, pp. 765–768 1978.*

G. Herberich et al., Chem. Ber. vol. 112, pp. 607–624 1979.*

U. Koelle, J. Organomet. Chem., vol. 152, pp. 225–228 May 1978.*

C. W. Allen and D. E. Palmer, "The Borabenzene Anion and Its Transition Metal Complexes", vol.55, No. 8, pp. 497–500 (1978).

D. A. Hoic et al., "A Boron Analogue of Benzene: Synthesis, Structrure, and Reactivity of 1–$H$–Boratabenzene", *Journal of American Chemical Society*, vol. 117, No. 32, pp. 8480–8481 (1995).

G. E. Herberich et al., "Borabenzene Derivatives. 22[1] Synthesis of Boratabenzene Salts from 2,4–Pentadienylboranes. Structure of [NMe$_3$Ph][C$_5$ H$_5$BMe]", *Organometallics*, vol. 14, pp.471–480 (1995).

"Boron Ring Systems as Ligands to Metls", *Comprehensive Organo–Metallic Chemistry*, vol. 1, pp. 392–410.

A. J. Ashe, III and P. Shu, "The 1–Phenylborabenzene Anion", *Journal of the American Chemical Society*, vol. 93, No. 7. pp. 1804–1805 (1971).

CHEMICAL ABSTRACT 142:146958u, Bazan et al., "Aminoboratabenzene Deriativesof Zirconium: A New Class of Olefin Polymerization Cataysts", *Journal of American Chemical Society*, vol. 118, No. 9, 2291–2292 (1996).

CHEMICAL ABSTRACT 125:58576H, S. Qiao et al., "Nucleophilic Aromatic Substitution Reactions of Borabenzene–Trimethyphosphine: A Versatile Route to 1–Substituted Boratabenzenes", *Journal of American Chemical Society*, vol. 118, No. 26, pp. 6329–6330 (1996).

CHEMICAL ABSTRACT 125:222129, D. A. Hoic et al., "Diphenylphoshidoboratabenzene: An Anionic Analog of Triphenylphosphine", *Journal of American Chemical Society*, vol. 118, No. 34, pp. 8176–8177 (1996).

CHEMICAL ABSTRACT 119:180866u, G. E. Herbrich et al., "Borabenzene derivatives, 21 2,4–Pentadienylboranes as key intermediates of a novel route to boracyclohexadienes and boratabenzenes, Structure of [Li(TMPDA)] (C$_8$H$_4$BNMe$_2$)", *Organometallics*, vol. 12, No.8 pp. 2891–2893 (1993).

CHEMICAL ABSTRACT 125:10902j, G. E. Herberich et al., "Borabenzene Derivatives 23. New Synthetic Entry into Borabenzene Chemistry via Doubly Kaliated Pentadienes: Synthesis of 1–(Dimethylamino)–3–methylene–1,2,3,6–tetrahydroborinines and lithium1–(Dimethylamino)–boratabenzene Deriatives", *Organometallics*, vol.15 No. 14, pp. 2707–2712 (1996).

CHEMICAL ABSTRACT 105:78994h, "1,2–Diborabenzene deriatives. Part1. 1,2–Diboratabenzene. Lithium salt ans transition metal complexes", Agnew Chemistry, vol. 98, No. 7 pp.637–638 (1986).

CHEMICAL ABSTRACT 74:13200t, G. E. Herberich et al., "Novel aromatic boron heterocycle as ligand in a transition metal π–complex", *Agnew Chemistry*, vol. 9, No. 10, pp. 805–806 (1970).

CHEMICAL ABSTRACT 123:83688n, T. Deforth et al., "A $\mu$–$\eta^6\eta^6$–1,3,5–triboratabenzenebis (cyclopentadienylcobalt) triple–decker complex", Agnew Chemistry, Int. Ed. Engl. vol.34, No. 6 pp.681–683 (1995).

CHEMICAL ABSTRACT 124:28619v, N. Noeth et al., "Boron–substituted heterocylces as π–donors in organometallic chemistry–a sandwich complex with 1–H–boratabenzene and lithium", *Angew Chemistry*, Int. Ed. Engl. vol. 35, No.3, pp. 292–293 (1996).

CHEMICAL ABSTRACT 98:4595u, G. E. Herberich et al., "Derivatives of 1,4–diboratabenzene: the first ionic 1,4–diborabenzene compound and transition metal complexes of 1,4–dibora–2,5–cyclohexadienes", *Chemische Berichte*, vol. 115, No.9 pp. 3115–3327 (1982).

CHEMICAL ABSTRACT 112:158540s, G. Maier et al., "Hetero–π systems. 18. Highly substituted 2, 4–di–tert–butyl–1–boracyclohexadienes", *Chemische Berichte*, vol. 123, No. 3, pp. 505–511 (1990).

CHEMICAL ABSTRACT 123:144083k, C. Psiorz et al., "Synthesis and application of ring–substituted analogs of the [(4–n–cyclopentadienylidene)–4,7,7–trimethyl–4,5,6, 7–tetrahydro–π-indenyl]ZrCl$_2$ *ansa–metallocene system*", *Chemische Berichte*, vol. 128, No.4 pp. 357–364 (1995).

CHEMICAL ABSTRACT 82–98029g, P. Shu, "Borabenzene anions and their iron (II) complexes", *Dissertation Abstracts International B*, vol. 35, No. 5 pp. 2105–2106 (1974).

CHEMICAL ABSTRACT 111:154058, G. E. Herberich et al., "Derivatives of 1,2–dibozabenzene. II (1,2–Dibora–3, 5–cyclohexadiene) metal complexes. Crystal structure of (C$_5$Me$_5$)Rh(C$_4$B$_2$Cl$_2$)", *Journal of Organometallic Chemistry*, vol. 355, No. 1–3, pp. 473–484 (1988).*

CHEMICAL ABSTRACT 121:301407x, T. C. Chung et al., "Synthesis and Functionalization of Unsaturated Polyethylene: Poly(ethylene–co–1,4–hexadiene)", *Macromolecules*, vol. 27, No. 26 pp. 7533–7537 (1994).*

CHEMICAL ABSTRACT 120:245442v, G. E. Herberich et al., "Tripledecker Complexes. X, The Boratabenzene ring as bridging ligand in tripledecker complexes. Synthesis and structure of [($\mu,\pi^6,\pi^6$–C$_5$H$_5$BMe)(RuCp*)$_2$] CF$_3$SO$_3$•0.5CH$_2$CL$_2$ and transfer of boratabenzene ring of ruthenium (RuCp*) fragment to a rhodium acation (RhCP*+) fragment", *Journal of Organometallic Chemistry*, vol. 459, No. 1, pp. 387–393 (1993).*

CHEMICAL ABSTRACT 124:176999a, T. C. Chung et al., "Metallocene catalysts and borane reagants in the block/ graft reactions of polyolefins", *Polymeric Materials Science and Engineering*, vol. 73, pp. 463–464 (1995).*

Bochmann, "Cationic Group 4 Metallocene Complexes and their Role in Polymerisation Catalysis: The Chemistry of Well Defined Ziegler Catalysts*", *J. Chem. Soc.*, pp. 255–270 (1996).*

* cited by examiner

US 6,255,246 B1

BORATABENZENE COCATALYST WITH METALLOCENE CATALYST

CROSS-REFERENCE TO RELATED APPLICATIONS

This application is a continuation of U.S. application Ser. No. 09/206,331 filed Dec. 8, 1998, abandoned, which is a continuation in part of U.S. application Ser. No. 08/821,506 filed Mar. 21, 1997 abandoned which is incorporated herein in its entirety and which claims the benefit of U.S. Provisional Application No. 60/014,745 filed Mar. 29, 1996, which is incorporated herein in its entirety.

BACKGROUND OF THE INVENTION

This invention relates to cocatalysts or activators useful with metallocene catalysts, particularly with metallocene catalysts used to make olefin polymers.

Metallocene catalysts are well known, especially for polymerization of olefins. The term "metallocene catalysts" is used to mean organometallic compounds having a rare earth or transition metal in coordination with members of at least one five-membered carbon (preferably cyclopentadienyl) ring.

It is generally recognized that cocatalysts or activators are useful with metallocene catalysts, especially in polymerization of olefins. Known activating cocatalysts include e.g. polymeric or oligomeric alumoxanes, especially methylalumoxane, triisobutyl aluminum modified methylalumoxane, or diisobutylalumoxane; strong Lewis acids (the term "strong Lewis acid" as used herein is defined as trihydrocarbyl substituted Group 13 compounds, especially tri(hydrocarbyl)aluminum- or tri(hydrocarbyl)boron compounds and halogenated derivatives thereof, having from 1 to 10 carbons in each hydrocarbyl or halogenated hydrocarbyl group, more especially perfluorinated tri(aryl) boron compounds, and most especially tris (pentafluorophenyl)borane); amine, phosphine, aliphatic alcohol and mercaptan adducts of halogenated tri($C_{1-10}$ hydrocarbyl)boron compounds, especially such adducts of perfluorinated tri(aryl)boron compounds; nonpolymeric, ionic, compatible, noncoordinating, activating compounds (including the use of such compounds under oxidizing conditions); and combinations of the foregoing activating cocatalysts and techniques. Preferred species include tris (pentafluorophenyl)borane and the ionic activators containing the anion tetrakis (pentafluorophenyl)borate. These compounds are effective but require several pentafluorophenyl groups per molecule which are difficult to obtain or synthesize and are, therefore, quite expensive. Ionic activators react irreversibly with metallocenes and therefore may be preferred over the neutral strong Lewis acid activators, which may react reversibly with a metallocene. However, a commercial drawback of these ionic activators is their poor solubility in the polymerization medium, i.e., hydrocarbon solvents.

It would be desirable to have activators or cocatalysts which retain good solubility in hydrocarbon solvents and are preferably less likely to result in reversible reactions and/or which are less expensive, that is use less of the difficult to obtain pentafluorophenyl group.

Boratabenzenes are known and have been used as ligands but are not used as cocatalysts, activators or counterions for metallocene catalysts.

The boratabenzenes are anionic species which are boron containing analogues to benzene. They are previously known in the art having been described by G. Herberich, et al., in Organometallics, 14,1, 471–480 (1995). They may be prepared by reaction of stannocyclohexadiene and a boron-trihalide followed by substitution with a hydrocarbyl group.

SUMMARY OF THE INVENTION

It has now been found that cocatalysts or activators comprising hydroboratabenzenes or boratabenzene anions, preferably as the neutral 1,4-dihydroboratabenzene, are useful in polymerization of olefins using metallocene catalysts. Boratabenzene cocatalysts advantageously involve fewer pentafluorophenyl groups than preferred trispentafluorophenyl borane and salts containing tetrakis(pentafluorophenyl) borates, respectively. Furthermore, 1,4-dihydroboratabenzenes are advantageously involved in less reversible reactions with metallocenes.

The present invention includes a process of polymerizing olefins using metallocene catalysts in the presence of at least one activator comprising a 1,4-dihydroboratabenzene or boratabenzene (collectively boratabenzene cocatalysts) as well as a process for polymerizing olefins using at least one metallocene catalyst wherein the catalyst is activated by at least one activator comprising a boratabenzene.

Further, the invention includes a composition of matter comprising at least one metallocene catalyst and at least one cocatalyst comprising a boratabenzene and compositions of matter comprising the resulting cationic metallocene catalysts and anionic boratabenzene counterions preferably which arise from the reaction of metallocenes in the +4 oxidation state with a cocatalyst comprising a boratabenzene.

Additionally, the invention includes perfluorophenyl hydroboratabenzenes of Formula 1 wherein R' is a pentafluorobenzene group, especially 1-pentafluorophenyl-1,4-dihydroboratabenzene [$C_5H_6B-C_6F_5$] and the anion thereof, [$C_5H_5B-C_6F_5$]$^-$.

Additional components in the compositions of the invention include trialkylaluminum and/or methylalumoxanes or derivatives, thereof, e.g. triisopropylaluminum modified methylaluminumoxane. Also included in the invention are reaction products of the compositions of the invention especially those formed under reaction (polymerization) conditions.

These examples are non-limiting and it is understood that metallocenes in the +3 or +2 oxidation state can react differently with a boratabenzene cocatalyst.

DETAILED DESCRIPTION OF THE INVENTION

Figure 1:
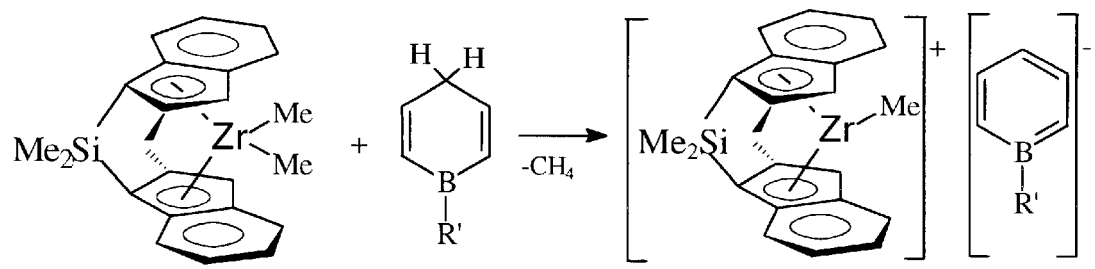
FIG. 1 is an illustrative equation of the invention using a boratabenzene as a cocatalyst to form a cationic metallocene catalyst.
Figure 2:
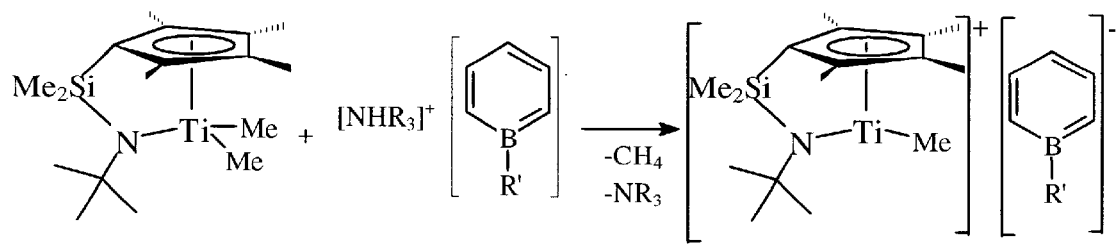
FIG. 2 is an illustrative equation of the invention using [$NHR_3$] [$C_5H_5BR'$] as the activating species.
Figure 3:
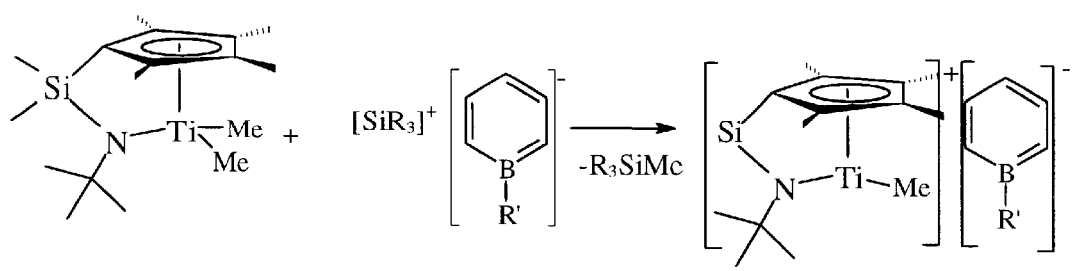
FIG. 3 is an illustrative equation of the invention using a strong Lewis acid cationic activator.

The term activator or cocatalyst is used herein to refer compounds which, when combined with a metallocene, result in a more active catalyst than the same metallocene would have been without the activator. The activators of the present invention fall into two classes: 1) The neutral 1,4-dihydroboratabenzene, Formula 1. 2) Salts containing the boratabenzene anion, Formula 2. The acidity of the protons in the 4 position of the 1,4-dihydroboratabenzenes render this class of compounds especially reactive towards metallocenes. An illustrative, but non-limiting, example of activation using a complex of Formula 1 is shown in FIG. 1, where a compound of Formula 1 is involved in a protonlysis reaction with a metallocene with liberation of methane. An illustrative, but non-limiting, example of activation using a complex of Formula 2 is shown in FIG. 2, where a compound of Formula 2 is involved in a protonlysis reaction with a metallocene with liberation of methane.

1,4-Dihydroboratabenzenes (hereinafter also referred to as hydroboratabenzenes or collectively with boratabenzene anions as boratabenzene cocatalysts) are compounds of Formula I:

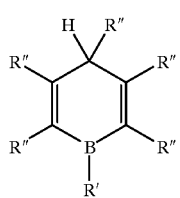

Formula 1 wherein R' is a hydrocarbyl group, silylhydrocarbyl, perfluorohydrocarbyl group, dialkylamido group or halide (Cl, Br, I or F, preferably Cl, Br or F more preferably F). The hydrocarbyl group, is linear, branched, cyclic, aromatic, alkyl aromatic, or arylalkyl and is unsubstituted or inertly substituted and preferably has less than about 24 carbon atoms, more preferably from 1 to about 24, most preferably from 1 to about 12 carbon atoms, particularly preferably about 6 carbon atoms, especially an unsubstituted or inertly substituted phenyl ring. Inertly substituted means having substituents which do not undesirably interfere with the function of the cocatalyst in activation of the metallocene catalyst or the catalytic activity of the resulting activated catalyst. Such inert substitutents include halogen atoms (Cl, Br, I, or F, more preferably Cl, Br, F, most preferably F), nitrogen-containing groups not having active hydrogen such as tertiary amine or amide groups, silyl groups, ether oxygen, and hydrocarbyl, perhalohydrocarbyl preferably pentafluorophenyl. Preferred hydrocarbyl groups include unsubstituted and fluoro substituted hydrocarbyl groups which are electron withdrawing in nature. The alkyl groups on dialkylamido groups are the same or different from one another and are independently unsubstituted or inertly substituted as the hydrocarbyl groups and preferably each have from 1 to about 24, preferably from 1 to about 12, most preferably from 1 to about 6 carbon atoms. Each R' independently optionally is or comprises a linking group described hereinafter.

Each R" is independently H, or an unsubstituted or inertly substituted hydrocarbyl, silylhydrocarbyl, perfluorocarbyl, alkoxide or dihydrocarbyl amido group. Each carbon-containing group is as described for R' and preferably has from 1 to 12 carbon atoms (for a total of preferably less than about 24 carbon atoms for the dialkylamido group). Two or more R" or R' and at least one R" are optionally joined into a ring or rings which are suitably aromatic, alkyl, or heteroatom containing rings or combinations thereof. Preferably all R" are H for ease of synthesis. For delocalizing the negative charge, each R" is preferably selected from fluorine, fluorohydrocarbyl, fluorocarbyl, chlorine, more preferably fluorine or fluorine-containing groups. Bulky hydrocarbyl groups, such as tertiary butyl, are also desirable R" groups as these groups often help render the boratabenzene anion non-coordinating. Each R" independently optionally is or comprises Δ, a linking group described hereinafter.

Advantageously, R' and R" are preferably selected to delocalize negative charge and thus stabilize the corresponding anion. Any R" which is not hydrogen is preferably ortho or para, more preferably para to the boron atom of the boratabenzene ring.

Compounds of Formula 1 are known to form anions of Formula 2 readily because of the acidity of the hydrogen atom. Acidity is increased by substitution which increases the ability of the boratabenzene ring to delocalize negative charge.

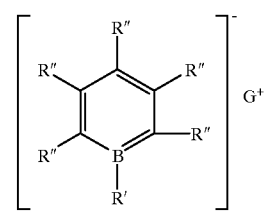

Formula 2 wherein R' and R" are as defined for Formula 1. For use in the practice of the current invention the boratabenzene anion of formula 2 is associated with a cation $G^+$. In one embodiment of this invention $G^+$ is the cation of an ionic activator. In this embodiment $G^+$ is preferably $[NHR_3]^+$, $[NR_4]^+$, $[SiR_3]^+$, $[CPh_3]^+$, or $[(C_5H_5)_2Fe]^+$ or $Ag^+$, where R is independently in each occurrence a hydrocarbyl, silylhydrocarbyl, or perfluorocarbyl of from 1 to 24 carbons, more preferably from 1 to 12 carbons arranged in a linear, branched, or ring structure. Ph is phenyl. In a preferred embodiment $[NHR_3]^+$ is $[NH(CH_3)(C_{18}H_{37})_2]^+$.

In the second embodiment of this invention $G^+$ is a cation arising from the reaction of a metallocene with a 1,4-dihydroboratabenzene of Formula 1. In this embodiment $G^+$ may be either the metallocene cation or a cationic species arising from a subsequent reaction.

Illustrative, but non-limiting, examples of 1,4-dihydroboratabenzene cocatalysts of Formula 1 are:
1-phenyl-1,4-dihydroboratabenzene;
1-methyl-1,4-dihydroboratabenzene;
1-ethyl-1,4-dihydroboratabenzene;
1-pentafluorophenyl-1,4-dihydroboratabenzene;
1-dimethylamido-1,4-dihydroboratabenzene;
1-neopentyl-1,4-dihydroboratabenzene;
1-'butyl-1,4-dihydroboratabenzene;
1-trimethylsilyl-1,4-dihydroboratabenzene;
1-trimethylsilylmethyl-1,4-dihydroboratabenzene;
1-fluoro-1,4-dihydroboratabenzene;
1-(3,5-bis-trifluoromethyl-phenyl)-1,4-dihydroboratabenzene;
1-phenyl-4-methyl-1,4-dihydroboratabenzene;
1-methyl-4-methyl-1,4-dihydroboratabenzene;

1-ethyl-4-methyl-1,4-dihydroboratabenzene;
1-pentafluorophenyl-4-methyl-1,4-dihydroboratabenzene;
1-dimethylamido-4-methyl-1,4-dihydroboratabenzene;
1-neopentyl-4-methyl-1,4-dihydroboratabenzene;
1-$^t$butyl-4-methyl-1,4-dihydroboratabenzene;
1-trimethylsilyl-4-methyl-1,4-dihydroboratabenzene;
1-trimethylsilylmethyl-4-methyl-1,4-dihydroboratabenzene;
1-fluoro-4-methyl-1,4-dihydroboratabenzene;
1-(3,5-bis-trifluoromethyl-phenyl)-4-methyl-1,4-dihydroboratabenzene;
1-phenyl-4-$^t$butyl-1,4-dihydroboratabenzene;
1-methyl-4-$^t$butyl-1,4-dihydroboratabenzene;
1-ethyl-4-$^t$butyl-1,4-dihydroboratabenzene;
1-pentafluorophenyl-4-$^t$butyl-1,4-dihydroboratabenzene;
1-dimethylamido-4-$^t$butyl-1,4-dihydroboratabenzene;
1-neopentyl-4-$^t$butyl-1,4-dihydroboratabenzene;
1-$^t$butyl-4-$^t$butyl-1,4-dihydroboratabenzene;
1-trimethylsilyl-4-$^t$butyl-1,4-dihydroboratabenzene;
1-trimethylsilylmethyl-4-$^t$butyl-1,4-dihydroboratabenzene;
1-fluoro-4-$^t$butyl-1,4-dihydroboratabenzene;
1-(3,5-bis-trifluoromethyl-phenyl)-4-$^t$butyl-1,4-dihydroboratabenzene;
1-phenyl-2,4-dimethyl-1,4-dihydroboratabenzene;
1,2,4-trimethyl-1,4-dihydroboratabenzene;
1-ethyl-2,4-dimethyl-1,4-dihydroboratabenzene;
1-pentafluorophenyl-2,4-dimethyl-1,4-dihydroboratabenzene;
1-dimethylamido-2,4-dimethyl-1,4-dihydroboratabenzene;
1-neopentyl-2,4-dimethyl-1,4-dihydroboratabenzene;
1-$^t$butyl-2,4-dimethyl-1,4-dihydroboratabenzene;
1-trimethylsilyl-2,4-dimethyl-1,4-dihydroboratabenzene;
1-trimethylsilylmethyl-2,4-dimethyl-1,4-dihydroboratabenzene;
1-fluoro-2,4-dimethyl-1,4-dihydroboratabenzene;
1-(3,5-bis-trifluoromethyl-phenyl)-2,4-dimethyl-1,4-dihydroboratabenzene;
1-phenyl-2-methoxide-4-$^t$butyl-1,4-dihydroboratabenzene;
1-methyl-2-methoxide-4-$^t$butyl-1,4-dihydroboratabenzene;
1-ethyl-2-methoxide-4-$^t$butyl-1,4-dihydroboratabenzene;
1-pentafluorophenyl-2-methoxide-4-$^t$butyl-1,4-dihydroboratabenzene;
1-dimethylamido-2-methoxide-4-$^t$butyl-1,4-dihydroboratabenzene;
1-neopentyl-2-methoxide-4-$^t$butyl-1,4-dihydroboratabenzene;
1-$^t$butyl-2-methoxide-4-$^t$butyl-1,4-dihydroboratabenzene;
1-trimethylsilyl-2-methoxide-4-$^t$butyl-1,4-dihydroboratabenzene;
1-trimethylsilylmethyl-2-methoxide-4-$^t$butyl-1,4-dihydroboratabenzene;
1-fluoro-2-methoxide-4-$^t$butyl-1,4-dihydroboratabenzene;
1-(3,5-bis-trifluoromethyl-phenyl)-2-methoxide-4-$^t$butyl-1,4-dihydroboratabenzene;
1-phenyl-4-$^t$butyl-6-trimethylsilyl-1,4-dihydroboratabenzene;
1-methyl-4-$^t$butyl-6-trimethylsilyl-1,4-dihydroboratabenzene;
1-ethyl-4-$^t$butyl-6-trimethylsilyl-1,4-dihydroboratabenzene;
1-pentafluorophenyl-4-$^t$butyl-6-trimethylsilyl-1,4-dihydroboratabenzene;
1-dimethylamido-4-$^t$butyl-6-trimethylsilyl-1,4-dihydroboratabenzene;
1-neopentyl-4-$^t$butyl-6-trimethylsilyl-1,4-dihydroboratabenzene;
1-$^t$butyl-4-$^t$butyl-6-trimethylsilyl-1,4-dihydroboratabenzene;
1-trimethylsilyl-4-$^t$butyl-6-trimethylsilyl-1,4-dihydroboratabenzene;
1-trimethylsilylmethyl-4-$^t$butyl-6-trimethylsilyl-1,4-dihydroboratabenzene;
1-fluoro-4-$^t$butyl-6-trimethylsilyl-1,4-dihydroboratabenzene;
1-(3,5-bis-trifluoromethyl-phenyl)-4-$^t$butyl-6-trimethylsilyl-1,4-dihydroboratabenzene;
1-phenyl-2-diethylamido-4-$^t$butyl-1,4-dihydroboratabenzene;
1-methyl-2-diethylamido-4-$^t$butyl-1,4-dihydroboratabenzene;
1-ethyl-2-diethylamido-4-$^t$butyl-1,4-dihydroboratabenzene;
1-pentafluorophenyl-2-diethylamido-4-$^t$butyl-1,4-dihydroboratabenzene;
1-dimethylamido-2-diethylamido-4-$^t$butyl-1,4-dihydroboratabenzene;
1-neopentyl-2-diethylamido-4-$^t$butyl-1,4-dihydroboratabenzene;
1-$^t$butyl-2-diethylamido-4-$^t$butyl-1,4-dihydroboratabenzene;
1-trimethylsilyl-2-diethylamido-4-$^t$butyl-1,4-dihydroboratabenzene;
1-trimethylsilylmethyl-2-diethylamido-4-$^t$butyl-1,4-dihydroboratabenzene;
1-fluoro-2-diethylamido-4-$^t$butyl-1,4-dihydroboratabenzene;
1-(3,5-bis-trifluoromethyl-phenyl)-2-diethylamido-4-$^t$butyl-1,4-dihydroboratabenzene;
1-phenyl-4-pentafluorophenyl-1,4-dihydroboratabenzene;
1-methyl-4-pentafluorophenyl-1,4-dihydroboratabenzene;
1-ethyl-4-pentafluorophenyl-1,4-dihydroboratabenzene;
1-4-bispentafluorophenyl-1,4-dihydroboratabenzene;
1-dimethylamido-4-pentafluorophenyl-1,4-dihydroboratabenzene;
1-neopentyl-4-pentafluorophenyl-1,4-dihydroboratabenzene;
1-$^t$butyl-4pentafluorophenyl-1,4-dihydroboratabenzene;
1-trimethylsilyl-4-pentafluorophenyl-1,4-dihydroboratabenzene;
1-trimethylsilylmethyl-4-pentafluorophenyl-1,4-dihydroboratabenzene;
1-fluoro-4-pentafluorophenyl-1,4-dihydroboratabenzene;
1-(3,5-bis-trifluoromethyl-phenyl)-4-pentafluorophenyl-1,4-dihydroboratabenzene, and mixtures thereof.

Illustrative, but non-limiting, examples of ionic cocatalysts of formula 2, containing the anionic derivatives of the aforementioned 1,4-dihydroboratabenzene are tri(n-butyl) ammonium salts; tri(propyl)ammonium salts; tri(t-butyl) ammonium salts; tri(ethyl)ammonium salts; tri(methyl) ammonium salts; N,N-di(methyl)anilium salts; N,N-di(ethyl)anilium salts; tri(phenyl)carbenium salts; Ag salts; ferrocenium salts; tetra(n-butyl)ammonium salts; tetra(propyl)ammonium salts; tetra(t-butyl)ammonium salts; tetra(ethyl)ammonium salts; tetra(methyl)ammonium salts; tri(n-butyl)silylium salts; tri(propyl)silylium salts; tri(t-butyl)silylium salts; tri(ethyl)silylium salts; and tri(methyl) silylium salts.

Of these compounds, preferred species of Formula 1 and 2 are those wherein R' is aromatic, preferably phenyl, most preferably perfluorophenyl. Alternatively R' is preferably fluorohydrocarbyl preferably perfluorohydrocarbyl. Of these, the preferred species are: 1-perfluorophenyl-1,4-dihydroboratabenzene, [$C_5H_6B-C_6F_5$] and the corresponding anion [$C_5H_5B-C_6F_5$]$^-$, compounds of Formulas 1 and 2 respectively wherein R' is perfluorophenyl and all R" are H. These compounds are novel compounds preferred in the practice of the invention because or their ability to stabilize the anion by delocalizing the negative charge.

These boratabenzene cocatalysts are useful to activate metallocene catalysts, including constrained geometry catalysts.

Synthesis of hydroboratabenzene and boratabenzene salts are within the skill in the art such as illustrated by Ashe, et al. *J. Amer. Chem. Soc.,* 1971, 93,1804–1805 (the nomenclature of which is followed herein); Hoic, et al., *J. Amer. Chem. Soc.,* 1995, 117, 8480–8481; Herberich, G. E. in *Comprehensive Organo-Metallic Chemistry*, Wilkinson, Stone and Abel, Pergamon, New York, Vol. 1, pages 392–409, 1982 and Herberich, et al., *Organometallics*, 1995, 14, 471–480 which are incorporated herein by reference. In a preferred synthesis, an optionally substituted 1,4-diacetylene, e.g. CH≡C—C≡CH is reacted with a dialkyltinhydride, e.g. $(n-C_4H_9)_2SnH_2$), to form the corresponding dihydrodialkylstannobenzene which is reacted with an organoborondibromide, e.g. phenylboron dibromide. To form a substituted species, e.g. the preferred pentafluorophenyl boratobenzene, a correspondingly substituted organoboron dibromide, e.g. pentafluorophenylboron dibromide is used. Substitution on the boratobenzene ring is achieved by use of a substituted 1,5-diacetylene or, alternatively, by reactions within the skill in the art on a boratabenzene ring or the dihydrodialkylstannabenzene. Alternatively, substituted 2,4-pentadienylboranes are used as starting materials in the synthesis disclosed by Herberich, et al.

Metallocene complexes are advantageously rendered catalytically active by combination with one or more activating cocatalysts, by use of an activating technique, or a combination thereof. Activating cocatalysts and activating techniques have been previously taught with respect to different metal complexes in the following references: EP-A-277,003, U.S. Pat. Nos. 5,153,157, 5,064,802, EP-A-468,651 (equivalent to U.S. Pat. No. 5,321,106), EP-A-520, 732 (equivalent to U.S. Pat. No. 5,721,185), and EP-A-640, 090 (equivalent to U.S. Pat. No. 5,350,723) the teachings of which are hereby incorporated by reference in their entireties. It is recognized by those skilled in the art that admixtures of metallocene catalysts and boratabenzenes may result in interactions between the molecular species present. The result of such interactions are referred to herein as interaction products, whatever form the interactions take, for instance chemical reactions, ionic reactions solvation and the like.

Practice of the invention is applicable to any metallocene catalyst within the skill in the art. In a preferred embodiment, at least one metallocene component comprises bridged, biscyclopentadienyl, Group 4, 5, or 6 transition metal, or Lanthanides. Preferred metallocenes include bridged bisindenyl, Group 4 dihalide, dihydrocarbyl and diene derivatives. When dihalide metallocenes are used in the present invention they are advantageously first contacted with at least one trihydrocarbyl aluminum or alumoxane species prior to reaction with a boratabenzene cocatalyst. Specific metallocene catalysts known in the art are discussed in such references as EPA Nos. 485,820; 485,821; 485,822; 485,823; 518,092; and 519,237; U.S. Pat. Nos. 5,145,819; 5,296,434, all hereby incorporated herein by reference in their entireties.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Advantageous catalysts for use herein are advantageously derivatives of any transition metal including Lanthanides, but preferably of Group 3, 4, or Lanthanide metals which are in the +2, +3, or +4 formal oxidation state. Preferred compounds include metal complexes containing from 1 to 3 π-bonded anionic or neutral ligand groups, which are optionally cyclic or non-cyclic delocalized π-bonded anionic ligand groups. Exemplary of such π-bonded anionic ligand groups are conjugated or nonconjugated, cyclic or non-cyclic dienyl groups, and allyl groups. By the term "π-bonded" is meant that the ligand group is bonded to the transition metal by means of its delocalized π electrons.

Each atom in the delocalized π-bonded group is optionally independently substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 hetero atom containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such adjacent radicals may together form a fused ring system, a hydrogenated fused ring system, or a metallocycle with the metal. Suitable hydrocarbyl-substituted organo-metalloid radicals include mono-, di- and tri-substituted organometalloid radicals of Group 14 elements wherein each of the hydrocarbyl groups contains from 1 to 20 carbon atoms. Examples of advantageous hydrocarbyl-substituted organo-metalloid radicals include trimethylsilyl, triethylsilyl, ethyldimethylsilyl, methyldiethylsilyl, triphenylgermyl, and trimethylgermyl groups. Examples of Group 15 or 16 hetero atom containing moieties include amine, phosphine, ether or thioether moieties or monovalent derivatives thereof, e. g. amide, phosphide, ether or thioether groups bonded to the transition metal or Lanthanide metal, and bonded to the hydrocarbyl group or to the hydrocarbyl-substituted metalloid containing group.

Examples of advantageous anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydroanthracenyl groups, as well as $C_{1-10}$ hydrocarbyl-substituted or $C_{1-10}$ hydrocarbyl-substituted silyl substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethlindenyl, fluorenyl, 2-methylindenyl, 2-methyl-4-phenylindenyl, tetrahydrofluorenyl, octahydrofluorenyl, and tetrahydroindenyl.

A preferred class of catalysts are transition metal complexes corresponding to the formula: $Cp_lMX_mX'_nX''_p$, or a dimer thereof wherein:

Cp is an anionic, delocalized, π-bonded group that is bound to M, containing up to 50 non-hydrogen atoms, optionally two Cp groups may be joined together forming a bridged structure, and further optionally one Cp is bound to X;

M is a metal of Group 4 of the Periodic Table of the Elements in the +2, +3 or +4 formal oxidation state;

X is an optional, divalent substituent of up to 50 non-hydrogen atoms that together with Cp forms a metallocycle with M;

X' at each occurrence is an optional neutral Lewis base having up to 20 non-hydrogen atoms;

X" each occurrence is a monovalent, anionic moiety having up to 40 non-hydrogen atoms, optionally, two X" groups are covalently bound together forming a divalent dianionic moiety having both valences bound to M, or, optionally 2 X" groups are covalently bound together to form a neutral, conjugated or nonconjugated diene that is π-bonded to M (whereupon M is in the +2 oxidation state), or further optionally one or more X" and one or more X' groups are bonded together thereby forming a moiety that is both covalently bound to M and coordinated thereto by means of Lewis base functionality;

l is 0, 1 or 2;

m is 0 or 1;

n is a number from 0 to 3;

p is an integer from 0 to 3; and the sum, l+m+p, is equal to the formal oxidation state of M, except when 2 X" groups together form a neutral conjugated or non-conjugated diene that is π-bonded to M, in which case the sum l+m is equal to the formal oxidation state of M.

Preferred complexes include those containing either one or two Cp groups. The latter complexes include those containing a bridging group linking the two Λ groups. Preferred bridging groups are those corresponding to the formula $(ER^*_2)_x$ wherein E is silicon, germanium, tin, or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, ethyl, propyl, benzyl, tert-butyl, phenyl, methoxy, ethoxy or phenoxy.

Examples of the complexes containing two Cp groups are compounds corresponding to the formula:

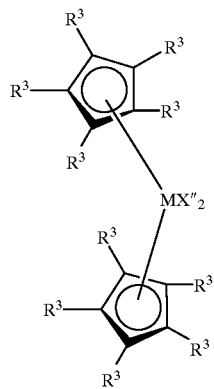

(AI)

or

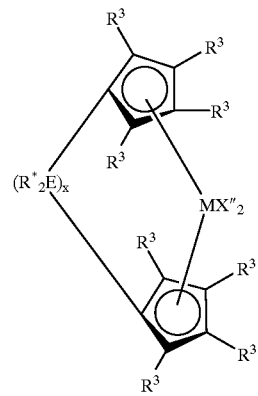

(AII)

wherein:

M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (e.g., a hydrocarbadiyl, germadiyl group) thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms forming a π-complex with M, whereupon M is in the +2 formal oxidation state, and R*, E and x are as previously defined.

The foregoing metal complexes are especially suited for the preparation of polymers having stereoregular molecular structure. In such capacity it is preferred that the complex possesses $C_s$ symmetry or possesses a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., J. Am. Chem. Soc. 110, 6255–6256 (1980). Examples of chiral structures include rac bis-indenyl complexes. Similar systems based on Ti(IV) or Zr(IV) were disclosed for preparation of isotactic olefin polymers in Wild et al., J. Organomet. Chem., 232, 233–47, (1982).

Exemplary bridged ligands containing two π-bonded groups are: (dimethylsilyl-bis(cyclopentadienyl)), (dimethylsilyl-bis(methylcyclopentadienyl)), (dimethylsilyl-bis(ethylcyclopentadienyl)), (dimethylsilyl-bis(t-butylcyclopentadienyl)), (dimethylsilyl-bis(tetramethylcyclopentadienyl)), (dimethylsilyl-bis(indenyl)), (dimethylsilyl-bis(tetrahydroindenyl)), (dimethylsilyl-bis(fluorenyl)), (dimethylsilyl-bis(tetrahydrofluorenyl)), (dimethylsilyl-bis(2-methyl-4-phenylindenyl)), (dimethylsilyl-bis(2-methylindenyl)), (dimethylsilyl-cyclopentadienyl-fluorenyl), (dimethylsilyl-cyclopentadienyl-octahydrofluorenyl), (dimethylsilyl-cyclopentadienyl-tetrahydrofluorenyl), (1,1,2,2-tetramethyl-1,2-disilyl-bis-cyclopentadienyl), (1,2-bis(cyclopentadienyl)ethane, and (isopropylidene(cyclopentadienyl)(fluorenyl)).

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups, including those optionally formed from two X" groups together.

A further class of metal complexes utilized in the present invention corresponds to the preceding formula $Cp_lMX_mX'_nX''_p$, or a dimer thereof, wherein X is a divalent substituent of up to 50 non-hydrogen atoms that together with Cp forms a metallocycle with M.

Preferred divalent X substituents include groups containing up to 30 non-hydrogen atoms comprising at least one atom that is oxygen, sulfur, boron or a member of Group 14 of the Periodic Table of the Elements directly attached to the delocalized π-bonded group, and a different atom, selected from the group consisting of nitrogen, phosphorus, oxygen or sulfur that is covalently bonded to M.

A preferred class of such Group 4 metal coordination complexes used according to the present invention corresponds to the formula:

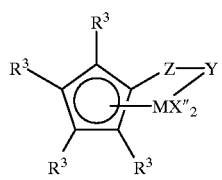

(AIII)

wherein:
M is titanium or zirconium in the +2 or +4 formal oxidation state;
X" and $R^3$ are as previously defined for formulas AI and AII;
Y is —O—, —S—, —NR*—, —PR*—; and
Z is $SiR^*_2$, $CR^*_2$, $SiR^*_2SiR^*_2$, $CR^*_2CR^*_2$, $CR^*=CR^*$, $CR^*_2SiR^*_2$, or $GeR^*_2$, wherein R* is as previously defined.

Illustrative Group 4 metal complexes that may be employed in the practice of the present invention include: cyclopentadienyltitaniumtrimethyl, cyclopentadienyltitaniumtriethyl, cyclopentadienyltitaniumtriisopropyl, cyclopentadienyltitaniumtriphenyl, cyclopentadienyltitaniumtribenzyl, cyclopentadienyltitanium-2,4-dimethylpentadienyl, cyclopentadienyltitanium-2,4-dimethylpentadienyl•triethylphosphine, cyclopentadienyltitanium-2,4-dimethylpentadienyl•trimethylphosphine, cyclopentadienyltitaniumdimethylmethoxide, cyclopentadienyltitaniumdimethylchloride, pentamethylcyclopentadienyltitaniumtrimethyl, indenyltitaniumtrimethyl, indenyltitaniumtriethyl, indenyltitaniumtripropyl, indenyltitaniumtriphenyl, tetrahydroindenyltitaniumtribenzyl, pentamethylcyclopentadienyltitaniumtriisopropyl, pentamethylcyclopentadienyltitaniumtribenzyl, pentamethylcyclopentadienyltitaniumdimethylmethoxide, pentamethylcyclopentadienyltitaniumdimethylchloride, bis($\eta^5$-2,4-dimethylpentadienyl)titanium, bis($\eta^5$-2,4-dimethylpentadienyl)titanium•trimethylphosphine, bis($\eta^5$-2,4-dimethylpentadienyl)titanium•triethylphosphine, octahydrofluorenyltitaniumtrimethyl, tetrahydroindenyltitaniumtrimethyl, tetrahydrofluorenyltitaniumtrimethyl, (tert-butylamido)(1,1-dimethyl-2,3,4,9,10-η-1,4,5,6,7,8-hexahydronaphthalenyl)dimethylsilanetitaniumdimethyl, (tert-butylamido)(1,1,2,3-tetramethyl-2,3,4,9,10-η-1,4,5,6,7,8-hexahydronaphthalenyl)dimethylsilanetitaniumdimethyl, (tert-butylamido)(tetramethyl-$\eta^5$-cyclopentadienyl)dimethylsilanetitanium dibenzyl, (tert-butylamido)(tetramethyl-$\eta^5$-cyclopentadienyl)dimethylsilanetitanium dimethyl, (tert-butylamido)(tetramethyl-$\eta^5$-cyclopentadienyl)-1,2-ethanediyltitanium dimethyl, (tert-butylamido)(tetramethyl-$\eta^5$-indenyl)dimethylsilanetitanium dimethyl, (tert-butylamido)(tetramethyl-$\eta^5$-cyclopentadienyl)dimethylsilane titanium (III) 2-(dimethylamino)benzyl; (tert-butylamido)(tetramethyl-$\eta^5$-cyclopentadienyl)dimethylsilanetitanium (III) allyl, (tert-butylamido)(tetramethyl-$\eta^5$-cyclopentadienyl) dimethylsilanetitanium (III) 2,4-dimethylpentadienyl, (tert-butylamido)(tetramethyl-$\eta^5$-cyclopentadienyl) dimethylsilanetitanium (II) 1,4-diphenyl-1,3-butadiene, (tert-butylamido)(tetramethyl-$\eta^5$-cyclopentadienyl) dimethylsilanetitanium (II) 1,3-pentadiene, (tert-butylamido)(2-methylindenyl)dimethylsilanetitanium (II) 1,4-diphenyl-1,3-butadiene, (tert-butylamido)(2-methylindenyl)dimethylsilanetitanium (II) 2,4-hexadiene, (tert-butylamido)(2-methylindenyl) dimethylsilanetitanium (IV) 2,3-dimethyl-1,3-butadiene, (tert-butylamido)(2-methylindenyl) dimethylsilanetitanium (IV)isoprene, (tert-butylamido)(2-methylindenyl)dimethylsilanetitanium 1,3-butadiene, (tert-butylamido)(2,3-dimethylindenyl) dimethylsilanetitanium (IV) 2,3-dimethyl-1,3-butadiene, (tert-butylamido)(2,3-dimethylindenyl) dimethylsilanetitanium (IV) isoprene; (tert-butylamido)(2,3-dimethylindenyl)dimethylsilanetitanium (IV) dimethyl; (tert-butylamido)(2,3-dimethylindenyl) dimethylsilanetitanium (IV) dibenzyl; (tert-butylamido)(2,3-dimethylindenyl)dimethylsilanetitanium 1,3-butadiene,(tert-butylamido)(2,3-dimethylindenyl) dimethylsilanetitanium (II) 1,3-pentadiene, (tert-butylamido)(2,3-dimethylindenyl)dimethylsilanetitanium (II) 1,4-diphenyl-1,3-butadiene, (tert-butylamido)(2-methylindenyl)dimethylsilanetitanium (II) 1,3-pentadiene,(tert-butylamido)(2-methylindenyl) dimethylsilanetitanium (IV) dimethyl, (tert-butylamido) (2-methylindenyl)dimethylsilanetitanium (IV) dibenzyl, (tert-butylamido)(2-methyl-4-phenylindenyl) dimethylsilanetitanium (II) 1,4-diphenyl-1,3-butadiene, (tert-butylamido)(2-methyl-4-phenylindenyl) dimethylsilanetitanium (II) 1,3-pentadiene, (tert-butylamido)(2-methyl-4-phenylindenyl) dimethylsilanetitanium (II) 2,4-hexadiene, (tert-butylamido)(tetramethyl-$\eta^5$-cyclopentadienyl)dimethylsilanetitanium 1,3-butadiene, (tert-butylamido) (tetramethyl-$\eta^5$-cyclopentadienyl)dimethylsilanetitanium 2,3-dimethyl-1,3-butadiene, (tert-butylamido)(tetramethyl-$\eta^5$-cyclopentadienyl)dimethylsilanetitanium (IV) isoprene, (tert-butylamido) (tetramethyl-$\eta^5$-cyclopentadienyl)dimethylsilanetitanium (II) 1,4-dibenzyl-1,3-butadiene, (tert-butylamido)(tetramethyl-$\eta^5$-cyclopentadienyl) dimethylsilanetitanium (II) 2,4-hexadiene, (tert-butylamido)(tetramethyl-$\eta^5$-cyclopentadienyl) dimethylsilanetitanium (II) 3-methyl-1,3-pentadiene, (tert-butylamido)(2,4-dimethylpentadien-3-yl)dimethylsilanetitaniumdiethyl, (tert-butylamido)(6,6-dimethylcyclohexadienyl)dimethylsilanetitaniumdimethyl, (tert-butylamido)(1,1-dimethyl-2,3,4,9,10-$\eta$-1,4,5,6,7,8-hexahydronaphthalen-4-yl) dimethylsilanetitaniumdimethyl, (tert-butylamido)(1,1,2,3-tetramethyl-2,3,4,9,10-$\eta$-1,4,5,6,7,8-hexahydronaphthalen-4-yl) dimethylsilanetitaniumdimethyl(tert-butylamido) (tetramethyl-$\eta^5$-cyclopentadienyl methylphenylsilanetitanium (IV) dimethyl, (tert-butylamido) (tetramethyl-$\eta^5$-cyclopentadienyl methylphenylsilanetitanium (II) 1,4-diphenyl-1,3-butadiene, 1-(tert-butylamido)-2-(tetramethyl-$\eta^5$-cyclopentadienyl) ethanediyl-titanium (IV) dimethyl, and 1-(tert-butylamido)-2-(tetramethyl-$\eta^5$-cyclopentadienyl) ethanediyl-titanium (II) 1,4-diphenyl-1,3-butadiene.

Complexes containing two Cp groups including bridged complexes suitable for use in the present invention include:
bis(cyclopentadienyl)zirconiumdimethyl, bis(cyclopentadienyl)zirconium dibenzyl,
bis(cyclopentadienyl)zirconium methyl benzyl, bis(cyclopentadienyl)zirconium methyl phenyl, bis(cyclopentadienyl)zirconiumdiphenyl, bis(cyclopentadienyl)titanium-allyl,
bis(cyclopentadienyl)zirconiummethylmethoxide,
bis(cyclopentadienyl)zirconiummethylchloride,
bis(pentamethylcyclopentadienyl)zirconiumdimethyl,
bis(pentamethylcyclopentadienyl)titaniumdimethyl,
bis(indenyl)zirconiumdimethyl,
indenylfluorenylzirconiumdimethyl,
bis(indenyl)zirconiummethyl(2-(dimethylamino)benzyl),
bis(indenyl)zirconium methyltrimethylsilyl,
bis(tetrahydroindenyl)zirconium methyltrimethylsilyl,
bis(pentamethylcyclopentadienyl)zirconiummethylbenzyl,
bis(pentamethylcyclopentadienyl)zirconiumdibenzyl,
bis(pentamethylcyclopentadienyl) zirconiummethylmethoxide,
bis(pentamethylcyclopentadienyl)zirconiummethylchloride,
bis(methylethylcyclopentadienyl)zirconiumdimethyl,
bis(butylcyclopentadienyl)zirconium dibenzyl, bis(t-butylcyclopentadienyl)zirconiumdimethyl,
bis(ethyltetramethylcyclopentadienyl)zirconiumdimethyl,
bis(methylpropylcyclopentadienyl)zirconium dibenzyl,
bis(trimethylsilylcyclopentadienyl)zirconium dibenzyl,
dimethylsilyl-bis(cyclopentadienyl)zirconiumdimethyl,
dimethylsilyl-bis(tetramethylcyclopentadienyl)titanium-(III) allyl
dimethylsilyl-bis(t-butylcyclopentadienyl) zirconiumdichloride, dimethylsilyl-bis(n-butylcyclopentadienyl)zirconiumdichloride,
(methylene-bis(tetramethylcyclopentadienyl)titanium(III) 2-(dimethylamino)benzyl,
(methylene-bis(n-butylcyclopentadienyl)titanium(III) 2-(dimethylamino)benzyl,
dimethylsilyl-bis(indenyl)zirconiumbenzylchloride,
dimethylsilyl-bis(2-methylindenyl)zirconiumdimethyl,
dimethylsilyl-bis(2-methyl-4-phenylindenyl) zirconiumdimethyl,
dimethylsilyl-bis(2-methylindenyl)zirconium-1,4-diphenyl-1,3-butadiene,
dimethylsilyl-bis(2-methyl-4-phenylindenyl)zirconium (II) 1,4-diphenyl-1,3-butadiene, dimethylsilyl-bis (tetrahydroindenyl)zirconium(II) 1,4-diphenyl-1,3-butadiene, dimethylsilyl-bis(fluorenyl) zirconiummethylchloride,
dimethylsilyl-bis(tetrahydrofluorenyl)zirconium bis (trimethylsilyl),
(isopropylidene)(cyclopentadienyl)(fluorenyl) zirconiumdibenzyl, and
dimethylsilyl(tetramethylcyclopentadienyl)(fluorenyl) zirconium dimethyl.

Other catalysts, especially catalysts containing other Group 4 metals, will, of course, be apparent to those skilled in the art.

Preferred metallocene species for use in the practice of the present invention include constrained geometry metal complexes, including titanium complexes, and methods for their preparation are disclosed in U.S. Pat. No. 5,703,187, U.S. application Ser. No. 967,365, filed Oct. 28, 1992, U.S. Pat. Nos. 5,721,185, 5,055,438, 5,057,475, 5,096,867, 5,064,802, 5,096,867, 5,132,380, 5,132,380, 5,470,993, 5,486,632, 5,132,380, and 5,321,106. The teachings of all the foregoing patents, publications and patent applications is hereby incorporated by reference in their entireties.

Especially preferred are metallocene catalysts of Formulas 3–10.

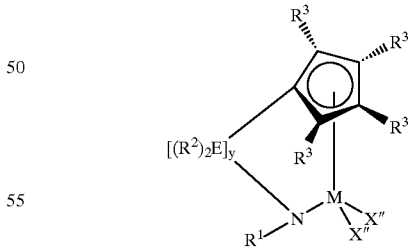

Formula 3 wherein each X" is independently hydrocarbyl, silylhydrocarbyl, including conjugated diene ligand which coordinates in a metallocyclopentene fashion; $R^1$ is hydrocarbyl or silylhydrocarbyl; E is C or Si; $R^2$ is hydrocarbyl, silylhydrocarbyl or hydrogen; y is 1 or 2; M is a transition metal, preferably Hf, Zr or Ti; each $R^3$ is independently hydrocarbyl or silylhydrocarbyl; wherein two adjacent $R^3$ groups are optionally linked to form a ring structure, such as an indenyl ligand. These catalysts are referred to herein as constrained geometry catalysts in the +4 formal oxidation state and are within the skill in the art as illustrated by U.S. Patents on constrained geometry catalysts incorporated herein by reference previously.

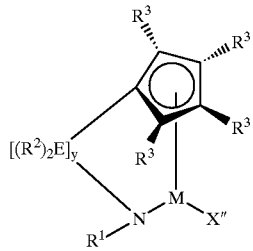

Formula 4

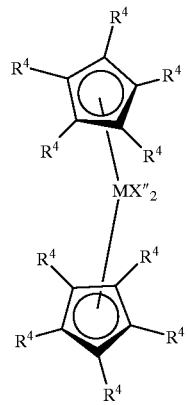

Formula 6 wherein X" is a stabilized hydrocarbyl, or silylhydrocarbyl moiety which is optionally further substituted with at least one amine, ether, phosphine, or thioether group which is capable of stabilizing the reduced metal center, or an allyl or a hydrocarbyl substituted allyl moiety; $R^1$ is hydrocarbyl or silylhydrocarbyl; E is C or Si; $R^2$ is hydrocarbyl or silylhydrocarbyl or hydrogen; y is 1 or 2; M is a transition metal, preferably Hf, Zr or Ti; each $R^3$ is independently hydrocarbyl or silylhydrocarbyl wherein two adjacent $R^3$ groups are optionally linked to form a ring structure, such an indenyl ligand. These catalysts are referred to herein as constrained geometry catalysts in the +3 formal oxidation state and are within the skill in the art as illustrated by U.S. Patents on constrained geometry catalysts which are incorporated herein by reference previously, especially U.S. Pat. No. 5,374,696.

wherein X" is defined as for Formula 3; M is a transition metal, preferably Zr, Ti or Hf; each $R^4$ is independently hydrocarbyl or silylhydrocarbyl; wherein two adjacent $R^4$ groups are optionally linked to form a ring structure, such as an indenyl ligand, and wherein an $R^4$ from one cyclopentadienyl moiety and an $R^4$ group on a second cyclopentadienyl moiety are optionally linked to form a bridged (or looped) ansa metallocene, as shown below in Formula 9. These catalysts are referred to herein as biscyclopentadienyl catalysts in the +4 formal oxidation state and are within the skill in the art as illustrated by U.S. Pat. Nos. 3,242,099 and 5,198,401 which are incorporated herein by reference in their entireties.

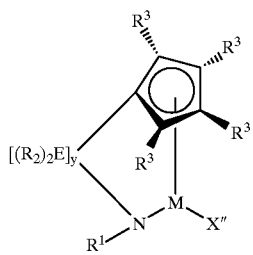

Formula 5

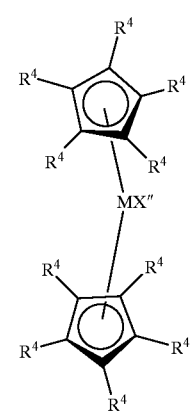

Formula 6 wherein X" is a conjugated diene ligand bound to the metal center by a π bond; $R^1$ is hydrocarbyl, or silylhydrocarbyl; E is C or Si; $R^2$ is hydrocarbyl, silylhydrocarbyl or hydrogen; y is 1 or 2; M is a transition metal, preferably Zr or Ti; each $R^3$ is independently hydrocarbyl or silylhydrocarbyl, wherein, two adjacent $R^3$ groups are optionally linked to form a ring structure, such an indenyl ligand. These catalysts are referred to herein as constrained geometry catalysts in the +2 formal oxidation state and are fully disclosed in U.S. Pat. No. 5,470,993 (Devore et al.) which is incorporated herein by reference its entirety.

wherein X" and M are as defined for Formula 4; and $R^4$ is as defined for Formula 6. These catalysts are referred to herein as biscyclopentadienyl catalysts in the +3 formal oxidation state and are within the skill in the art as illustrated by U.S. Pat. Nos. 5,374,696 and 5,494,874 which are incorporated herein by reference in their entireties.

Formula 8

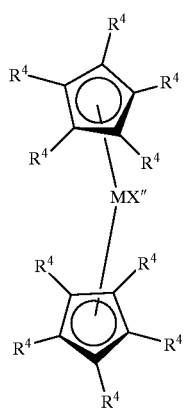

wherein X" and M are as defined for Formula 5; and $R^4$ is as defined for Formula 6. These catalysts are referred to herein as biscyclopentadienyl catalysts in the +2 formal oxidation state and are fully disclosed in U.S. Pat. No. 5,616,664, which is incorporated herein by reference in its entirety.

Formula 9

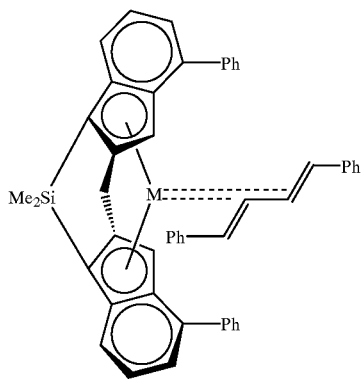

wherein M is as defined for Formula 8 and each Ph is independently an unsubstituted or inertly substituted phenyl group and each Me is independently an unsubstituted or inertly substituted methyl group; both Ph and Me are preferably unsubstituted. These catalysts are referred to herein as ansa metallocene catalysts and are within the skill in the art as illustrated by U.S. Pat. No. 5,616,664, which is incorporated herein by reference above. Such ansa-metallocenes are especially useful in the stereospecific polymerization of prochrial monomers such as propylene.

Formula 10

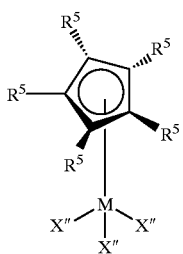

wherein X" is as defined as in Formula 3; M is a transition metal, preferably Hf, Zr or Ti; and each $R^5$ is independently as defined for $R^4$ in Formula 6. These catalysts are referred to herein as monocyclopentadienyl catalysts in the +4 formal oxidation state and are within the skill in the art as illustrated by U.S. Pat. Nos. 5,064,918; 4,774,301; 5,045,517, and 4,808,680 which are incorporated herein by reference in their entireties.

In each formula each hydrocarbyl group is preferably from 1 to about 50, more preferably from 1 to about 24, most preferably from 1 to about 15 non-hydrogen atoms.

Advantageous compounds useful as a cocatalyst in one embodiment of the present invention comprise a cation which is a Bronsted acid capable of donating a proton, and an inert, compatible, noncoordinating, boratabenzene anion. Preferred anions are those most capable of balancing the charge of the cationic component which is formed when the two components are combined. Also, said anion is preferably sufficiently labile to be displaced by olefinic, diolefinic and acetylenically unsaturated compounds or other neutral Lewis bases such as ethers or nitriles.

Cocatalysts or activators comprising boratabenzenes are used in amounts and under conditions within the skill in the art for other cocatalysts or activators. Their use is applicable to all metallocene catalyzed processes within the skill in the art, including solution, slurry, bulk (especially propylene), and gas phase polymerization processed. Such processes include those fully disclosed in the references cited and incorporated by reference above. Useful monomers to be polymerized include ethylene, propylene, styrene, butene, hexene, pentene, octene and the like.

The molar ratio of catalyst/cocatalyst or activator employed preferably ranges from about 1:10,000 to about 100:1, more preferably from about 1:5000 to about 10:1, most preferably from about 1:1000 to about 1:1. Optionally the cocatalyst is used in combination with a $C_{3-30}$ trihydrocarbyl aluminum compound or oligomeric or polymeric alumoxane. Mixtures of activating cocatalysts may also be employed. It is possible to employ these aluminum compounds for their beneficial ability to scavenge impurities such as oxygen, water, and aldehydes from the polymerization mixture. Preferred aluminum compounds include $C_{2-6}$ trialkyl aluminum compounds, especially those wherein the alkyl groups are ethyl, propyl, isopropyl, n-butyl, isobutyl, pentyl, neopentyl, or isopentyl, and methyl-alumoxane, modified methylalumoxane and diisobutyl-alumoxane. The molar ratio of aluminum compound to metal complex is preferably from about 1:10,000 to about 1000:1, more preferably from about 1:5000 to about 100:1, most preferably from about 1:100 to about 100:1.

Advantageous addition polymerizable monomers include ethylenically unsaturated monomers, acetylenic compounds, conjugated or non-conjugated dienes, and polyenes. Preferred monomers include olefins, for examples alpha-olefins having from 2 to 20,000, preferably from 2 to 20, more preferably from 2 to 8 carbon atoms and combinations of two or more of such alpha-olefins. Particularly suitable alpha-olefins include, for example, ethylene, propylene, 1-butene, 1-pentene, 4-methylpentene-1, 1-hexene, 1-heptene, 1-octene, 1-nonene, 1-decene, 1-undecene, 1-dodecene, 1-tridecene, 1-tetradecene, 1-pentadecene, or combinations thereof, as well as long chain vinyl terminated oligomeric or polymeric reaction products formed during the polymerization, and $C_{10-30}$ α-olefins specifically added to the reaction mixture in order to produce relatively long chain branches in the resulting polymers. Preferably, the alpha-olefins are ethylene, propene, 1-butene, 4-methyl-pentene-1, 1-hexene, 1-octene, and combinations of ethylene and/or propene with one or more of such other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the above-mentioned monomers may also be employed.

In most instances, the polymerization advantageously takes place at conditions known in the prior art for Ziegler-Natta or Kaminsky-Sinn type polymerization reactions, i.e., temperatures from 0–250° C. and pressures from atmospheric to 3000 atmospheres. Suspension, solution, slurry, gas phase or high pressure, whether employed in batch or continuous form or under other process conditions, including the recycling of condensed monomers or solvent, is optionally employed. Examples of such processes are well known in the art for example, WO 88/02009-A1 or U.S. Pat. No. 5,084,534, disclose conditions that are advantageously employed with the polymerization catalysts and are incorporated herein by reference in their entireties. A support, especially silica, alumina, or a polymer (especially polytetrafluoroethylene or a polyolefin) is optionally employed, and desirably is employed when the catalysts are used in a gas phase polymerization process. Such supported catalysts are advantageously not affected by the presence of liquid aliphatic or aromatic hydrocarbons such as are optionally present under the use of condensation techniques in a gas phase polymerization process. Methods for the preparation of supported catalysts are disclosed in numerous references, examples of which are U.S. Pat. Nos. 4,808,561, 4,912,075, 5,008,228, 4,914,253, and 5,086,025 and are suitable for the preparation of supported catalysts.

The catalysts are optionally also utilized in combination with at least one additional homogeneous or heterogeneous polymerization catalyst in separate reactors connected in series or in parallel to prepare polymer blends having desirable properties. An example of such a process is disclosed in WO 94/00500, equivalent to U.S. application Ser. No. 07/904,770. A more specific process is disclosed in copending application U.S. application Ser. No. 08/10958, filed Jan. 29, 1993. The teachings of the foregoing publications and pending applications are hereby incorporated by reference.

Use of boratabenzene cocatalysts according to the practice of the invention provides effective cocatalyst or activator activity at lower expense than the prior art of using compounds such as tris(pentafluorophenyl)borane or salts containing tetrakis(pentafluorophenyl)borate which have more of the scarce and difficult to synthesize pentafluorophenyl group per molecule than do the preferred boratabenzenes.

Additionally, boratabenzene cocatalysts are more effective activators than the prior art compounds such as tris (pentafluorophenyl)borane or salts containing tetrakis (pentafluorophenyl)borate in that when a hydrocarbon is abstracted in reactions as illustrated in FIG. 1 where a methyl group is removed and methane formed, the reaction is less reversible and recombination is not observed as readily as with the preferred prior art activators and cocatalysts.

The metallocene employed is optionally supported on an inert carrier and optionally prepolymerized. Numerous support techniques are known in the art. One technique is employed in accordance with U.S. Pat. No. 5,240,894, herein incorporated by reference in its entirety. Advantageously, the supported metallocene is employed in a prepolymerized fashion. The prepolymer is optionally any alpha olefin, preferably ethylene, propylene, or butene.

The boratabenzene cocatalysts are optionally either chemically bound to a support, for instance by chemically reacting a substituent on the boratabenzene with the support or are evaporated from solution onto a support.

Advantageous inorganic oxide supports for use in the present invention include highly porous silicas, aluminas, aluminosilicates, aluminophosphates, clays, titanias, and mixtures thereof. Preferred inorganic oxides are alumina and silica. The most preferred support material is silica. The support material may be in granular, agglomerated, pelletized, or any other physical form.

Supports advantageous for the present invention preferably have a surface area as determined by nitrogen porosimetry using the B.E.T. method from 10 to about 1000 $m^2/g$, and preferably from about 100 to 600 $m^2/g$. The pore volume of the support, as determined by nitrogen adsorption, advantageously is between 0.1 and 3 $cm^3/g$, preferably from about 0.2 to 2 $cm^3/g$. The average particle size is not critical but typically is from 0.5 to 500 $\mu m$, preferably from 1 to 150 $\mu m$.

Inorganic oxides, especially silica, alumina and aluminosilicates are known to inherently possess small quantities of hydroxyl functionality attached to the atomic matrix. When used to prepare a reactive component, these materials are preferably first subjected to a heat treatment and/or chemical treatment to reduce the hydroxyl content to about 0.001–10 mmole/g, more preferably 0.01–1.0 mmole/g, most preferably 0.1–0.8 mmole/g. Advantageous heat treatments (calcining) are carried out at a temperature from 150 to 900° C., preferably 300 to 850° C. for a duration of about 10 minutes to 50 hours. Advantageous chemical treatments include contacting with Lewis acid alkylating agents such as trihydrocarbyl aluminum compounds, trihydrocarbylchlorosilane compounds, trihydrocarbylalkoxysilane compounds or similar agents. Residual hydroxyl functionality can be detected by the technique of Fourier Transform Infrared Spectroscopy (DRIFTS IR) as disclosed in Fourier Transform Infrared Spectroscopy, P. Griffiths & J. de Haseth, 83 *Chemical Analysis*, Wiley Interscience (1986), p. 544.

The inorganic oxide is optionally unfunctionalized except for surface hydroxyl groups as previously disclosed. In this embodiment of the invention the low hydroxyl content of the support leads to superior properties of the resulting supported catalyst, believed to be (but not limited to) lack of interference with the transition metal complex by the residual hydroxyl groups. Preferred hydroxyl contents of such support are less than 0.8 mmole/g, preferably less than 0.5 mmole/g.

The inorganic oxide is optionally also be functionalized by treating with a silane, hydrocarbyloxysilane, or chlorosilane functionalizing agent to attach thereto pendant reactive silane functionality, as previously disclosed. Suitable functionalizing agents are compounds that react with the surface hydroxyl groups of the inorganic oxide or react with the metal or metalloid atoms of the inorganic oxide matrix. Examples of advantageous functionalizing agents include phenylsilane, diphenylsilane, methylphenylsilane, dimethylsilane, diethylsilane, diethoxysilane, and chlorodimethylsilane. Techniques for forming such functionalized inorganic oxide compounds were previously disclosed in U.S. Pat. Nos. 3,687,920 and 3,879,368, the teachings of which are herein incorporated by reference.

In a preferred embodiment the silane and the inorganic oxide are contacted, optionally in the presence of a hydrocarbon diluent, in the presence of a base, preferably a $C_{1-4}$ trialkylamine. The reaction is conducted at a temperature from 0 to 110° C., preferably from 20 to 50° C. Advantageously an excess of functionalizing agent is employed. Preferred ratios of functionalizing agent based on inorganic oxide are from 1 to 2500 mmole/g. As a result of the foregoing functionalizing reaction, residual hydroxyl functionality of the inorganic oxide is further reduced to the previously mentioned low level of less than about 1.0 mmole/g. Preferably, the residual hydroxyl content of functionalized supports is less than 0.8 mmole/g, and most preferably less than 0.5 mmole/g. Highly preferably preparing an advantageous support, a calcined silica is employed having initial (i. e. prefunctionalized) residual hydroxyl content less than 1.0 mmole/g, and from 1 to 20 mmole of functionalizing agent/g silica is employed. The molar ratio of base assist employed to functionalizing agent is advantageously about from 0.7:1 to about 2.0:1. Unreacted functionalizing agent is preferably removed from the surface of the inorganic oxide, for example, by washing with a liquid hydrocarbon, and the support is preferably thoroughly dried prior to use in preparing supported catalyst systems.

The activator according to the present invention can be linked to a support and corresponds to the Formula 1 or 2 wherein at least one of R' or R" has (comprises, includes or is substituted with) at least one linking group comprising functionality capable of reaction with the support, with and inorganic oxide matrix, thereof, with residual hydroxyl functionality thereof, or with reactive silane functional groups thereon, e.g. of the optionally functionalized inorganic oxide, or a combination thereof.

Suitable linking substituents used with unmodified inorganic oxides or with inorganic oxide containing only residual hydroxyl functionality, include moieties bearing silane, siloxane, hydrocarbyloxysilane, halosilane, amino, carboxylic acid, carboxylic acid ester, aldehyde, ketone or epoxide functionality, containing from 1 to $1\times10^6$ nonhydrogen atoms, more preferably from 2 to 1000 nonhydrogen atoms, and most preferably 4 to 20 nonhydrogen atoms. In practice, use of silane containing compatible anions may require use of a base catalyst, such as a tri($C_{1-4}$ alkyl)amine, to effect the reaction with a substrate containing only residual hydroxyl functionality. Preferably, the linking substituent for use with such unmodified inorganic oxide compounds is a silane or chlorosilane substituted hydrocarbyl radical. Preferred linking substituents include silyl-substituted aryl, silyl-substituted aralkyl, silyl-substituted alkaryl, silyl-substituted alkyl, silyl-substituted haloaryl, or silyl-substituted haloalkyl groups, including polymeric linking groups, most preferably p-silylphenyl (—$C_6H_4SiH_3$), p-silyltetrafluorophenyl (—$C_6F_4SiH_3$), silylnaphthyl (—$C_{10}H_8SiH_3$), silylperfluoronaphthyl (—$C_{10}F_8SiH_3$), and 2-silyl-1-ethyl(—$C_2H_4SiH_3$), groups.

Advantageous linking substituents used with inorganic oxides that have been modified with reactive silane functionality include moieties bearing silane, siloxane, hydrocarbyloxysilane, halosilane, hydroxyl, thiol, amino, carboxylic acid, carboxylic acid ester, aldehyde, ketone or epoxide functionality containing from 1 to $1\times10^6$ nonhydrogen atoms, more preferably from 2 to 1000 nonhydrogen atoms, and most preferably 4 to 20 nonhydrogen atoms. Preferably, the linking substituent in such circumstances, is a hydroxyl substituted hydrocarbyl radical, more preferably a hydroxy-substituted aryl, hydroxy-substituted aralkyl, hydroxy-substituted alkaryl, hydroxy-substituted alkyl, hydroxy-substituted haloaryl, or hydroxy-substituted haloalkyl group including polymeric linking groups, most preferably hydroxyphenyl, hydroxytolyl, hydroxybenzyl, hydroxynaphthyl, hydroxybisphenyl, hydroxycyclohexyl, $C_{1-4}$ hydroxyalkyl, and hydroxy-polystyryl groups, or fluorinated derivatives thereof. A most preferred linking substituent is a p-hydroxyphenyl, 4-hydroxybenzyl, 6-hydroxy-2-naphthyl group, 4-(4'-hydroxyphenyl)phenyl, 4-((4'-hydroxyphenyl)dimethylmethylene)phenyl, or fluorinated derivatives thereof. A base catalyst, such as a tri($C_{1-4}$ alkyl) amine, may also be used to assist in the reaction with the substrate.

Most highly preferably, the linking substituent is one of the foregoing hydroxy substituted substituents used in combination with a reactive silane functionalized silica.

Advantageously, the ratio of moles of activator compound to moles of transition metal compound in a supported catalyst is from about 0.5:1 to about 2:1, preferably from 0.5:1 to 1.5:1 and most preferably from 0.75:1 to 1.25:1. At too low ratios the supported catalyst will not be very active, whereas at too high ratios the catalyst cost becomes excessive due to the relatively large quantities of activator compound utilized. The quantity of transition metal complex chemically bound to the inorganic oxide matrix in the resulting supported catalyst is preferably from 0.0005 to 20 mmole/g, more preferably from 0.001 to 10 mmole/g.

A supported catalyst can be prepared by combining the support material, the activator compound and the metal complex in any order. Preferably, the inorganic oxide material is first treated with the activator compound by combining the two components in a suitable liquid diluent, such as an aliphatic or aromatic hydrocarbon to form a slurry. The temperature, pressure, and contact time for this treatment are not critical, but generally vary from −20° C. to about 150° C., from 1 Pa to 10,000 MPa, more preferably at atmospheric pressure (100 kPa), for 5 minutes to 48 hours. Usually the slurry is agitated. After this treatment the solids are typically separated from the diluent.

Before using the support, the diluent or solvent is preferably removed to obtain a free flowing powder. This is preferably done by applying a technique which only removes the liquid and leaves the resulting solid, such as by applying heat, reduced pressure, evaporation, or a combination thereof. Alternatively, the support is optionally further contacted with the transition metal compound (or metallocene catalyst) prior to removing the liquid diluent. If so contacted the transition metal compound is preferably used dissolved in a suitable solvent, such as a liquid hydrocarbon solvent, advantageously a $C_{5-10}$ aliphatic or cycloaliphatic hydrocarbon or a $C_{6-10}$ aromatic hydrocarbon. Alternatively, a suspension or dispersion of the transition metal compound in a non-solvent may also be used. The contact temperature is not critical provided it is below the decomposition temperature of the transition metal and of the activator. Good results are obtained in a temperature range of 0 to 100° C. The contact may be total immersion in the liquid medium or contact with an atomized spray of the solution, dispersion or suspension. All steps in the present process should be conducted in the absence of oxygen and moisture. The resulting supported catalyst may be stored or shipped in free flowing form under inert conditions after removal of the solvent.

The supported catalysts of the present invention may be used in addition polymerization processes wherein one or more addition polymerizable monomers are contacted with the supported catalyst of the invention under addition polymerization conditions.

The supported catalyst can be formed in situ in the polymerization mixture by introducing into said mixture both a support, or its components, as well as a suitable transition metal compound. The supported catalyst can be advantageously employed in a high pressure, solution, slurry or gas phase polymerization process. A high pressure process is usually carried out at temperatures from 100 to 400° C. and at pressures above 500 bar. A slurry process typically uses an inert hydrocarbon diluent and temperatures of from about 0° C. up to a temperature just below the temperature at which the resulting polymer becomes substantially soluble in the inert polymerization medium. Preferred temperatures are from about 40° C. to about 115° C. The solution process is carried out at temperatures from the temperature at which the resulting polymer is soluble in an inert solvent up to about 275° C., preferably at temperatures of from about 130° C. to about 260° C., more preferably from about 150° C. to about 240° C. Preferred inert solvents are $C_{1-20}$ hydrocarbons and preferably $C_{5-10}$ aliphatic hydrocarbons, including mixtures thereof. The solution and slurry processes are usually carried out at pressures between about 100 kPa to 10 MPa. Typical operating conditions for gas phase polymerizations are from 20 to 100° C., more preferably from 40 to 80° C. In gas phase processes the pressure is typically from 10 kPa to 10 MPa. Condensed monomer or diluent may be injected into the reactor to assist in heat removal by means of latent heat of vaporization.

Preferably for use in gas phase polymerization processes, the support has a median particle diameter from about 20 to about 200 μm, more preferably from about 30 μm to about 150 μm, and most preferably from about 50 μm to about 100 μm. Preferably for use in slurry polymerization processes, the support has a median particle diameter from about 1 to about 200 μm, more preferably from about 5 μm to about 100 μm, and most preferably from about 20 μm to about 80 μm. Preferably for use in solution or high pressure polymerization processes, the support has a median particle diameter from about 1 to about 40 μm, more preferably from about 2 μm to about 30 μm, and most preferably from about 3 μm to about 20 μm.

In the polymerization process of the present invention, scavengers may be used which serve to protect the supported catalyst from catalyst poisons such as water, oxygen, and polar compounds. These scavengers are generally used in varying amounts depending on the amounts of impurities. Preferred scavengers include the aforementioned organoaluminum compounds of the formula $AIR_3$ or alumoxanes.

In the present polymerization process, molecular weight control agents can also be used. Examples of such molecular weight control agents include hydrogen, trialkyl aluminum compounds or other known chain transfer agents. A particular benefit of the use of the present supported catalysts is the ability (depending on reaction conditions) to produce narrow molecular weight distribution α-olefin homopolymers and copolymers. Preferred polymers have Mw/Mn of less than 2.5, more preferably less than 2.3. Such narrow molecular weight distribution polymer products, especially those from a slurry process are highly desirable due to improved tensile strength properties.

The following examples are used to illustrate this invention and not limit it. Ratios, parts, and percentages are by weight unless otherwise stated. Examples (Ex) of the invention are designated numerically while comparative samples (C.S.) are designated alphabetically and are not examples of the invention.

EXAMPLES

For use in the following examples, 1-phenyl-1,4-dihydroboratabenzene and 1-methyl-1,4-dihydroboratabenzene are synthesized following the method described in Herberich, G., et al., *Organometallics*, 1995, 14, 471; Ashe, A., et al., *J. Am. Chem. Soc.*, 1971, 93, 1804; Ashe, A., et al., *J. Am. Chem. Soc.*, 1975, 97, 6865, and references therein. 1-pentafluorophenyl-1,4-dihydroboratabenzene is synthesized in a method analogous to that reported for synthesizing 1-phenyl-boratabenzene in Ashe, *J. Am. Chem. Soc.*, 1971, 93, 1804, except that $C_6F_5BBr_2$ or alternatively $C_6F_5BCl_2$ is used in place of $C_6H_5BBr_2$.

Lithium salts are synthesized using the method reported for Li[1-phenyl-boratabenzene] in Ashe, *J. Am. Chem. Soc.*, 1971, 93, 1804. Then 1-phenyl-4-methyl-1,4-dihydroboratabenzene is synthesized by reacting the Li[1-phenyl-boratabenzene] with MeI (methyl iodide) in THF (tetrahydrofuran), followed by purification by means within the skill in the art. Li[1-phenyl-4-methyl-boratabenzene] is synthesized analogously, starting with Li[1-pentafluorophenyl-boratabenzene] synthesized analogous to the reported Li[1-phenyl-boratabenzene], but starting with the fluorinated starting material.

1,4-pentafluorophenyl-1,4-dihydroboratabenzene is synthesized by reacting Li[1-pentafluorophenyl-boratabenzene] with $C_6F_6$ in a hydrocarbon or ethereal solvent followed by purification using means within the skill in the art. Then Li[1,4-pentafluorophenyl-boratabenzene] is synthesized using the method reported from Li[1-phenyl-boratabenzene] Ashe, Ibid.

Example 1

Polymerization of Ethylene and Octene Using 1-Phenyl-1,4-dihydroboratabenzene Cocatalyst A two liter reactor is charged with 750 g of hydrocarbon solvent commercially available from Exxon Chemicals, Inc. under the trade designation Isopar E™ and 120 g 1-octene comonomer. Hydrogen is added as a molecular weight control agent by differential pressure expansion from a 75 ml addition tank from 300 psig (2070 kPa) to 275 psig (1890 kPa). The reactor is heated to the polymerization temperature of 140° C. and saturated with ethylene at 500 psig (3450 kPa). 5.00 mmole of (tert-butylamido)(tertamethyl-$\eta^5$-cyclopentadienyl)dimethylsilane titanium (II) 1,3-pentadiene (0.005 M solution in toluene) is combined with 5 mmole of 1-phenyl-1,4-dihydroboratabenzene (0.005 M solution in toluene) and is transferred to a catalyst addition tank. The polymerization is initiated by injecting the contents of the catalyst addition tank into the reactor using high pressure nitrogen. The polymerization conditions are maintained for 10 minutes with ethylene provided on demand at 500 psig, after which the reaction mixture is removed from the reactor and a solid copolymer of ethylene and octene is obtained upon removing the volatile compounds from the reaction mixture in a vacuum oven set at 120° C. for about 20 hr.

Example 2
Polymerization of Ethylene and Octene Using 1-Phenyl-4-methyl-1,4-dihydroboratabenzene Cocatalyst A two liter reactor is charged with 750 g of hydrocarbon solvent commercially available from Exxon Chemicals, Inc. under the trade designation Isopar E™ and 120 g 1-octene comonomer. The reactor is heated to the polymerization temperature of 140° C. and saturated with ethylene at 500 psig (3450 kPa). 5.00 mmole of (tert-butylamido)(tertamethyl-$\eta^5$-cyclopentadienyl)dimethylsilane titanium (IV) dimethyl (0.005 M solution in toluene) is combined with 5 mmole of 1-phenyl-4-methyl-1,4-dihydroboratabenzene (0.005 M solution in toluene) and is transferred to a catalyst addition tank. The polymerization is initiated by injecting the contents of the catalyst addition tank into the reactor using high pressure nitrogen. The polymerization conditions are maintained for 10 minutes with ethylene provided on demand at 500 psig (3450 kPa), after which the reaction mixture is removed from the reactor and a solid copolymer of ethylene and octene is obtained upon removing the volatile compounds from the reaction mixture in a vacuum oven set at 120° C. for about 20 hr.

Example 3
Polymerization of Ethylene and Octene Using Tributylammonium 1,4-Pentafluorophenyl-boratabenzene Cocatalyst
Synthesis of Tributylammonium 1,4-Bis(pentafluorophenyl)-boratabenzene In an argon atmosphere glovebox, equal molar amounts of tributylammonium chloride and lithium 1,4-bis(pentafluorophenyl)-boratabenzene are reacted in THF overnight. The THF is removed and toluene is added. The slurry is filtered through diatomaceous earth filter aid commercially available from Manville Products Corp. under the trade designation Celite™ and the residue washed with toluene until the washings are colorless. The filtrate volume is reduced and hexanes are added to precipitate the product. The solid is isolated on a frit, washed two times with 10 ml of hexanes, and dried in vacuo to give a yellow-orange solid.

The procedure of Example 1 is followed using 5.00 mmole of (tert-butylamido)(tertamethyl-$\eta^5$-cyclopentadienyl)dimethylsilane titanium (II) 1,3-pentadiene (0.005 M solution in toluene) in combination with 5 mmole of tributylammonium 1,4-pentafluorophenyl-boratabenzene (0.005 M solution in toluene).

Example 4
Polymerization of Ethylene and Octene Using Triphenylcarbenium 1-Methyl Boratabenzene Cocatalyst
Synthesis of Triphenylcarbenium 1-Methyl-boratabenzene In an argon atmosphere glovebox, equal molar amounts of triphenylmethyl chloride and lithium 1-methyl-boratabenzene are slurried in toluene overnight. The toluene is removed and dichloromethane is added. The slurry is filtered through diatomaceous earth filter aid commercially available from Manville Products Corp. under the trade designation Celite™, the filtrate volume is reduced, and hexanes are added to precipitate the product. The solid is isolated on a frit, washed two times with 10 ml of hexanes, and dried in vacuo to give a yellow solid.
Polymerization The procedure of Example 2 is followed using 5.00 mmole of (tert-butylamido)(tertamethyl-$\eta^5$-cyclopentadienyl)dimethylsilane titanium (IV) dimethyl (0.005 M solution in toluene) in combination with 5 mmole of triphenylcarbenium 1-methyl-boratabenzene (0.005 M solution in toluene).

Example 5
Polymerization of Ethylene and Octene Using Triethylsilylium 1-Phenyl-4-methyl Boratabenzene Cocatalyst
Synthesis of Triethylsilylium 1-Phenyl-4-methyl-boratabenzene In an argon atmosphere glovebox, triphenylcarbenium 1-phenyl-4-methyl-boratabenzene is combined with an excess of triethylsilane and stirred overnight at 25° C. The yellow solid is isolated on a frit and washed with hexanes to give a yellow-orange solid in nearly quantitative yield.
Polymerization The procedure of Example 2 is followed using 5.00 mmole of (tert-butylamido)(tertamethyl-$\eta^5$-cyclopentadienyl)dimethylsilane titanium (II) 1,4-diphenyl-1,3-butadiene (0.005 M solution in toluene) in combination with 5 mmole of triethylsilylium 1-phenyl-4-methyl-boratabenzene (0.005 M solution in toluene).

Example 6
Polymerization of Propylene Using 1-Pentafluorophenyl-1,4-Dihydroboratabenzene Cocatalyst A two liter reactor is charged with 500 ml of hydrocarbon solvent commercially available from Exxon Chemicals, Inc. under the trade designation Isopar E™ and 500 ml of propylene comonomer. Hydrogen is added as a molecular weight control agent by differential pressure expansion from a 75 ml addition tank from 300 psig (2070 kPa) to 275 psig (1890 kPa). The reactor is heated to the polymerization temperature of 70° C. 5.00 mmole of rac-dimethylsilyl-bis(2-methyl-4-phenyl-1-indenyl) zirconium (II) 1,4-diphenyl-1,3-butadiene (0.005 M solution in toluene) is combined with 5 mmole of 1-pentafluorophenyl-1,4-dihydroboratabenzene (0.005 M solution in toluene) and is transferred to a catalyst addition tank. The polymerization is initiated by injecting the contents of the catalyst addition tank into the reactor using high pressure nitrogen. The polymerization conditions are maintained for 15 minutes, after which the reactor is vented and the reaction mixture is removed from the reactor. Solid isotactic polypropylene is obtained upon removing the volatile compounds from the reaction mixture in a vacuum oven set at 120° C. for about 20 hr.

Example 7
Polymerization of Propylene Using 1,4-Dipentafluorophenyl-1,4-Dihydroboratabenzene Cocatalyst A two liter reactor is charged with 500 ml of hydrocarbon solvent commercially available from Exxon Chemicals, Inc. under the trade designation Isopar E™ and 500 ml of propylene comonomer. The reactor is heated to the polymerization temperature of 70° C. 5.00 mmole of rac-dimethylsilyl-bis(2-methyl-4-phenyl-1-indenyl) zirconium (IV) dimethyl (0.005 M solution in toluene) is combined with 5 mmole of 1,4-pentafluorophenyl-1,4-dihydroboratabenzene (0.005 M solution in toluene) and is transferred to a catalyst addition tank. The polymerization is initiated by injecting the contents of the catalyst addition tank into the reactor using high pressure nitrogen. The polymerization conditions are maintained for 15 minutes, after which the reactor is vented and the reaction mixture is removed from the reactor. Solid isotactic polypropylene is obtained upon removing the volatile compounds from the reaction mixture in a vacuum oven set at 120° C. for about 20 hr.

Example 8
Polymerization of Propylene Using Tributylammonium 1-Pentafluorophenyl-boratabenzene Cocatalyst
Synthesis of Tributylammonium 1-Pentafluorophenyl-boratabenzene In an argon atmosphere glovebox, equal molar amounts of tributylammonium chloride and lithium 1-pentafluorophenyl-boratabenzene are reacted in THF overnight. The THF is removed and toluene is added. The slurry is filtered through diatomaceous earth filter aid commercially available from Manville Products Corp. under the trade designation Celite™ and the residue washed with toluene until the washings are colorless. The filtrate volume is reduced and hexanes are added to precipitate the product. The solid is isolated on a frit, washed two times with 10 ml of hexanes, and dried in vacuo to give a yellow-orange solid.
Polymerization The procedure of Example 6 is followed using 5.00 mmole of rac-dimethylsilyl-bis(2-methyl-4-phenyl-1-indenyl) zirconium (II) 1,4-diphenyl-1,3-butadiene (0.005 M solution in toluene) in combination with 5 mmole of tributylammonium 1-pentafluorophenyl-boratabenzene (0.005 M solution in toluene).

Example 9
Polymerization of Propylene Using Tributylammonium 1-Phenyl-boratabenzene Cocatalyst
Synthesis of Tributylammonium 1-Phenyl-boratabenzene In an argon atmosphere glovebox, equal molar amounts of tributylammonium chloride and lithium 1-phenyl-boratabenzene are reacted in THF overnight. The THF is removed and toluene is added. The slurry is filtered through diatomaceous earth filter aid commercially available from Manville Products Corp. under the trade designation Celite™ and the residue washed with toluene until the washings are colorless. The filtrate volume is reduced and hexanes are added to precipitate the product. The solid is isolated on a frit, washed two times with 10 ml of hexanes, and dried in vacuo to give a yellow-orange solid.
Polymerization The procedure of Example 7 is followed using 5.00 mmole of rac-dimethylsilyl-bis(2-methyl-4-phenyl-1-indenyl) zirconium (IV) dimethyl (0.005 M solution in toluene) in combination with 5 mmole of tributylammonium 1-phenyl-boratabenzene (0.005 M solution in toluene).

Example 10
Polymerization of Propylene Using 1-Methyl-1,4-dihyroboratabenzene Cocatalyst The procedure of Example 7 is followed using 5.00 mmole of rac-dimethylsilyl-bis(2-methyl-4-phenyl-1-indenyl) zirconium (II) 1,4-diphenyl-1,3-butadiene (0.005 M solution in toluene) in combination with 5 mmole of 1-methyl-1,4-dihydroboratabenzene (0.005 M solution in toluene).

Example 11
Polymerization of Ethylene and Octene Using 1-Phenyl-1,4-dihyroboratanaphthalene Cocatalyst
Synthesis of 1-Phenyl-1,4-dihydroboratanapthalene To a solution of 1.05 grams (0.005 mol) of di-n-butyltindihydride in TMF (20 ml) was added 1.36 grams (0.005 mol) of di-n-butyltindichloride under nitrogen. The mixture was stirred at room temperature for 10 min. 1-Bromo-2-(prop-2-yne)benzene (1.75 grams, 0.009 mole) was added to the mixture and allowed to stir overnight. Lithium (0.14 grams, 0.02 mol) was added and the mixture stirred overnight. After quenching with saturated ammonium chloride, the mixture was extracted with methylene chloride, and the organic layer was dried and concentrated to yield the -1phenyl-1,4-dihydrostannanaphthales, which is then converted to the corresponding boratanaphthalene by reaction with phenyl boron dichloride, or in an alternative procedure, by reaction with phenyl boron dibromide.
Polymerization The procedure of Example 2 is followed using 5.00 mmole of (tert-butylamido)(tertamethyl-$\eta^5$-cyclopentadienyl)dimethylsilane titanium (II) 1,4-diphenyl-1,3-butadiene (0.005 M solution in toluene) in combination with 5 mmole of 1-phenyl-1,4-dihydroboratanapthalene (0.005 M solution in toluene).

Example 12
Polymerization of Propylene Using Triphenylcarbenium 1-Phenyl-boratanapthalene Cocatalyst
Synthesis of Triphenylcarbenium 1-Phenyl-boratanapthalene Lithium 1-phenyl-boratanapthalene is prepared from 1-phenyl-1,4-dihydroboratanaphthalene analogous to the preparation of Li[1-phenyl-boratabenzene] from 1-phenyl-1,4-dihydroboratabenzene reported by Ashe in J. Am. Chem. Soc., 1971, 93, p. 1804. To prepare the triphenylcarbenium derivative, equal molar amounts of triphenylmethyl chloride and lithium 1-phenyl-boratanapthalene are slurried in toluene overnight in an argon atmosphere glovebox. The toluene is removed and dichloromethane is added. The slurry is filtered through diatomaceous earth filter aid commercially available from Manville Products Corp. under the trade designation Celite™, the filtrate volume is reduced, and hexanes are added to precipitate the product. The solid is isolated on a frit, washed two times with 10 ml of hexanes, and dried in vacuo to give a yellow solid.

Polymerization

The procedure of Example 7 is followed using 5.00 mmole of rac-dimethylsilyl-bis(2-methyl-4-phenyl-1-indenyl) zirconium (II) 1,4-diphenyl-1,3-butadiene (0.005 M solution in toluene) in combination with 5 mmole of triphenylcarbenium 1-phenyl-boratanaphtalene (0.005 M solution in toluene).

Example 13
Synthesis of Triphenylcarbenium 1,4-Bis (pentafluorophenyl)-boratabenzene In an argon atmosphere glovebox, equal molar amounts of triphenylmethyl chloride and lithium 1,4-bis (pentafluorophenyl)-boratabenzene are slurried in toluene overnight. The toluene is removed and dichloromethane is added. The slurry is filtered through diatomaceous earth filter aid commercially available from Manville Products Corp. under the trade designation Celite™, the filtrate volume is reduced, and hexanes are added to precipitate the product. The solid is isolated on a frit, washed two times with 10 ml of hexanes, and dried in vacuo to give a yellow solid.

Example 14
Synthesis of 1-Phenyl-4-pentafluorophenyl-1,4-dihydro-5,6,7,8 Tetrafluoroboratanapthalene The synthetic procedure of Example 11 is repeated using 1-bromo-3,4,5,6-tetrafluoro-2(prop-2-pentafluorophenyl-2-yl)benzene as a starting material to produce the corresponding 1-di-n-butyl-1,4-dihydro-4-pentafluorophenyl-5,6,7,8-tetrafluorostannanaphthalene, which is then converted to the corresponding boratanaphthalene by reaction with phenyl boron dichloride, or in an alternative procedure, by reaction with phenyl boron dibromide.

Additional cocatalysts useful in the practice of the invention are synthesized as follows:

Synthesis of Triphenylcarbenium 1-Phenyl-4-methyl-boratabenzene

In an argon atmosphere glovebox, equal molar amounts of triphenylmethyl chloride and lithium 1-phenyl-4-methyl-boratabenzene are slurried in toluene overnight. The toluene is removed and dichloromethane is added. The slurry is filtered through diatomaceous earth filter aid commercially available from Manville Products Corp. under the trade designation Celite™, the filtrate volume is reduced, and hexanes are added to precipitate the product. The solid is isolated on a frit, washed two times with 10 ml of hexanes, and dried in vacuo to give a yellow solid.

Synthesis of Triethylsilylium 1-Methyl-boratabenzene

In an argon atmosphere glovebox, triphenylcarbenium 1-methyl-boratabenzene is combined with an excess of triethylsilane and stirred overnight at 25° C. The solid is isolated on a frit, washed two times with 10 mL of hexanes, and dried in vacuo to give a yellow-orange solid in nearly quantitative yield.

We claim:

1. A composition of matter comprising an admixture or reaction product of:

A) at least one metallocene corresponding to the formula $Cp_lMX_mX'_nX''_p$, or a dimer thereof, wherein:

Cp is an anionic, delocalized, π-bonded group that is bound to M, containing up to 50 non-hydrogen atoms, optionally two Cp groups may be joined together forming a bridged structure, or further optionally one Cp is bound to X;

M is a metal of Group 4 of the Periodic Table of the Elements in the +2, +3 or +4 formal oxidation state;

X is an optional, divalent substituent of up to 50 non-hydrogen atoms that together with Cp forms a metallocycle with M;

X' at each occurrence is an optional neutral Lewis base having up to 20 non-hydrogen atoms;

X" each occurrence is a monovalent, anionic moiety having up to 40 non-hydrogen atoms, optionally, two X" groups are covalently bound together forming a divalent dianionic moiety having both valences bound to M, or, optionally 2 X" groups are covalently bound together to form a neutral, conjugated or nonconjugated diene, or further optionally one or more X" and one or more X' groups are bonded together thereby forming a moiety that is both covalently bound to M and coordinated thereto by means of a Lewis base functional group;

l is 0, 1 or 2;

m is 0 or 1;

n is a number from 0 to 3;

p is an integer from 0 to 3; and the sum, l+m+p, is equal to the formal oxidation state of M, except when 2 X" groups together form a neutral conjugated or non-conjugated diene, in which case the sum l+m is equal to the formal oxidation state of M; and B) at least one boratabenzene compound of Formula 1 or 2:

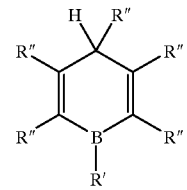

Formula 1

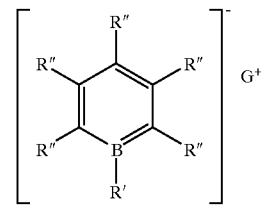

Formula 2 wherein:

R' is a fluoro-substituted hydrocarbyl group;

each R" is independently H, or an unsubstituted or inertly substituted hydrocarbyl, silylhydrocarbyl, perfluorohydrocarbyl, alkoxide or dihydrocarbyl amido group, and the hydrocarbyl group is a linear, branched, cyclic, aromatic, alkyl aromatic, or arylalkyl group, and two or more R" groups, or R' including at least one R" group are optionally joined into a ring or rings which are aromatic, cycloalkyl, or heteroatom rings or combinations thereof;

and further optionally each R' and R" independently is or comprises a linking group having at least one functional group capable of reaction with a support, with an inorganic oxide matrix of a support, with residual hydroxyl functional groups of a support, or with reactive silane functional groups on a support; and G$^+$ is a cation selected from the group consisting of, [NHR$_3$]$^+$, [NR$_4$]$^+$, [SiR$_3$]$^+$, [CPh$_3$]$^+$, [(C$_5$H$_5$)$_2$Fe]$^+$ and Ag$^+$, where R is independently in each occurrence a hydrocarbyl, silylhydrocarbyl, or perfluorocarbyl group of from 1 to 24 carbons.

2. The composition of claim 1 wherein the metallocene catalyst is of Formula 3, 4, or 5

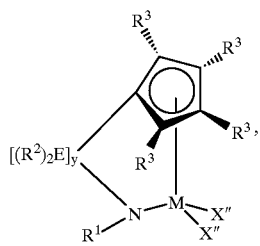

Formula 3 wherein:
each X" is independently hydrocarbyl, silylhydrocarbyl, or two X" together are a diene ligand which coordinates in a metallocyclopentene fashion;
R$^1$ is hydrocarbyl or silylhydrocarbyl;
E is C or Si; R$^2$ is hydrocarbyl, silylhydrocarbyl or hydrogen;
y is 1 or 2;
M is Hf, Zr or Ti;
each R$^3$ is independently hydrocarbyl or silylhydrocarbyl; or two adjacent R$^3$ groups are linked to form a ring structure,

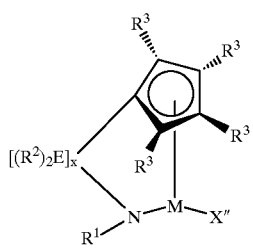

Formula 4 wherein:
X" is a hydrocarbyl, or silylhydrocarbyl moiety which is further substituted with at least one amine, ether, phosphine, or thioether group, or an allyl or a hydrocarbyl substituted allyl moiety;
R$^1$ is hydrocarbyl or silylhydrocarbyl;
E is C or Si;
R$^2$ is hydrocarbyl or silylhydrocarbyl or hydrogen;
M is Hf, Zr or Ti; and
each R$^3$ is independently hydrocarbyl or silylhydrocarbyl or two adjacent R$^3$ groups are linked to form a ring structure;

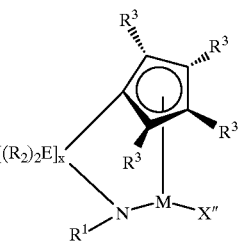

Formula 5 wherein:
X" is a conjugated diene ligand;
R$^1$ is hydrocarbyl, or silylhydrocarbyl;
E is C or Si;
R$^2$ is hydrocarbyl, silylhydrocarbyl or hydrogen;
M is Hf, Zr, or Ti;
each R$^3$ is independently hydrocarbyl or silylhydrocarbyl, or two adjacent R$^3$ groups are linked to form a ring structure.

3. The composition of claim 1 wherein the metallocene is

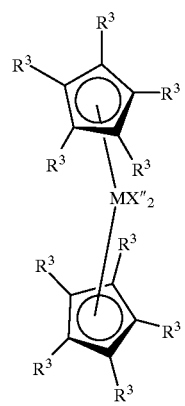

(AI)

or

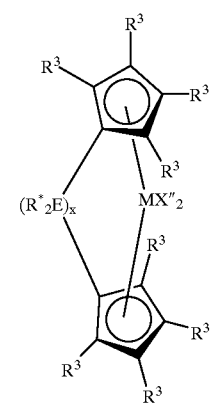

(AII)

wherein:
M is zirconium or hafnium, in the +2 or +4 formal oxidation state;
R$^3$ in each occurrence independently is selected from the group consisting of hydrogen, hydrocarbyl, silyl, germyl, cyano, halo and combinations thereof, said R$^3$ having up to 20 non-hydrogen atoms, or adjacent R$^3$ groups together form a divalent derivative thereby forming a fused ring system, X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms, whereupon M is in the +2 formal oxidation state, E is silicon, germanium, tin, or carbon, R* independently each occurrence is hydrogen or a group selected from silyl, hydrocarbyl, hydrocarbyloxy and combinations thereof, said R* having up to 30 carbon or silicon atoms, and x is 1 to 8.

4. The composition of claim 1 wherein the metallocene is of Formula 8, 9, or 10:

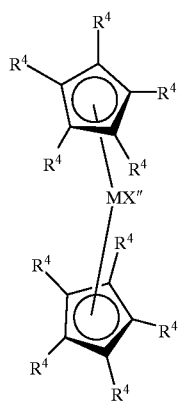

Formula 8 wherein X" and M are as defined for Formula 5; and $R^4$ is as defined for Formula 6;

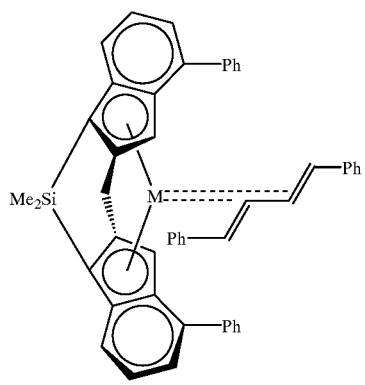

Formula 9 wherein M is as defined for Formula 8 and each Ph is independently an unsubstituted or inertly substituted phenyl group and each Me is independently an unsubstituted or inertly substituted methyl group;

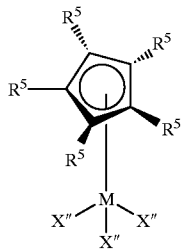

Formula 10 wherein each X" is independently hydrocarbyl, silylhydrocarbyl or two X" groups together are a diene ligand which coordinates in a metallocyclopentene fashion;

M is Hf, Zr or Ti; and each $R^5$ is independently hydrocarbyl or silylhydrocarbyl or two adjacent groups are optionally linked to form a ring structure.

5. The composition of any one of claims 1–4 wherein R' is perfluorophenyl.

6. The composition of claim 5 wherein at least one R" is H.

7. The composition of claim 5 wherein all R" are H.

8. The composition of claim 1 wherein $G^+$ is $(NH(CH_3)(C_{18}H_{37})_2)^+$.

9. The composition of claim 5 wherein $G^+$ is $(NH(CH_3)(C_{18}H_{37})_2)^+$.

10. The composition of claim 7 wherein $G^+$ is $(NH(CH_3)(C_{18}H_{37})_2)^+$.

11. The composition of claim 1 additionally comprising an inorganic oxide support.

12. The composition of claim 11 wherein the boratabenzene compound is chemically bound to the support.

13. The composition of claim 11 where, in the boratabenzene compound, at least one of R' or R" comprises a functional group capable of reaction with the inorganic oxide matrix of the support, residual hydroxide functional groups of the support, reactive silane functional groups on the support, or a combination thereof.

14. A composition of matter according to claim 1 additionally comprising an alumoxane or aluminum trialkyl.

15. A composition of matter according to claim 4 wherein component B) comprises pentafluorophenylboratabenzene or pentafluorophenylboratabenzene anion, $[C_5H_5B—C_6F_5]^-$.

16. A composition of matter according to claim 5 wherein component B) comprises pentafluorophenylboratabenzene or pentafluorophenylboratabenzene anion, $[C_5H_5B—C_6F_5]^-$.

17. A composition of matter according to claim 8 wherein component B) comprises pentafluorophenylboratabenzene or pentafluorophenylboratabenzene anion, $[C_5H_5B—C_6F_5]^-$.

18. A process of polymerizing at least one olefin comprising containing said olefin with the composition of claim 1.

* * * * *